US012155646B2

(12) United States Patent
Hassan et al.

(10) Patent No.: US 12,155,646 B2
(45) Date of Patent: *Nov. 26, 2024

(54) AUTHENTICATION WITH RANDOM NOISE SYMBOLS AND PATTERN RECOGNITION

(71) Applicant: Microsoft Technology Licensing, LLC, Redmond, WA (US)

(72) Inventors: Amer Aref Hassan, Kirkland, WA (US); Wei-Chen Chen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 402 days.

This patent is subject to a terminal disclaimer.

(21) Appl. No.: 16/436,721

(22) Filed: Jun. 10, 2019

(65) Prior Publication Data

US 2020/0389443 A1 Dec. 10, 2020

(51) Int. Cl.
*H04L 9/40* (2022.01)
*H04W 12/06* (2021.01)

(52) U.S. Cl.
CPC .......... *H04L 63/083* (2013.01); *H04W 12/06* (2013.01); *G06F 2218/00* (2023.01); *H04L 2209/08* (2013.01)

(58) Field of Classification Search
CPC ..... H04L 63/083; H04L 63/102; G06F 21/31; H04W 12/06; H04W 12/08
See application file for complete search history.

(56) References Cited

U.S. PATENT DOCUMENTS

| | | | |
|---|---|---|---|
| 5,267,299 A | 11/1993 | Nomura | |
| 5,680,470 A | 10/1997 | Moussa et al. | |
| 5,815,665 A | 9/1998 | Teper et al. | |
| 6,079,021 A | 6/2000 | Abadi et al. | |
| 6,081,570 A | 6/2000 | Ghuman et al. | |
| 6,195,698 B1* | 2/2001 | Lillibridge | G06F 21/31 709/228 |
| 6,643,342 B1 | 11/2003 | Wakabayashi | |

(Continued)

FOREIGN PATENT DOCUMENTS

| | | |
|---|---|---|
| CN | 101197095 A | 6/2008 |
| CN | 101374149 A | 2/2009 |

(Continued)

OTHER PUBLICATIONS

A. Goyal and P. Matta, "Two-way Robust Authentication Method to Prevent Shoulder Surfing Attack, " 2023 Second International Conference on Augmented Intelligence and Sustainable Systems (ICAISS), Trichy, India, 2023, pp. 1295-1300. (Year: 2023).*

(Continued)

*Primary Examiner* — Kari L Schmidt
(74) *Attorney, Agent, or Firm* — Schwegman Lundberg & Woessner, P.A.

(57) ABSTRACT

Disclosed in some examples are methods, systems and machine-readable mediums which allow for more secure authentication attempts by implementing authentication systems with credentials that include interspersed noise symbols in positions determined by the user. These systems secure against eavesdroppers such as shoulder-surfers or man-in-the middle attacks as it is difficult for an eavesdropper to separate the noise symbols from legitimate credential symbols.

18 Claims, 17 Drawing Sheets

(56) References Cited

U.S. PATENT DOCUMENTS

| | | |
|---|---|---|
| 6,954,862 B2 | 10/2005 | Serpa |
| 7,215,727 B2 | 5/2007 | Yousef et al. |
| 7,451,322 B2 | 11/2008 | Lee |
| 7,552,467 B2 | 6/2009 | Lindsay |
| 7,581,113 B2 | 8/2009 | Smith et al. |
| 7,600,128 B2 | 10/2009 | Pritchard et al. |
| 7,653,818 B2 | 1/2010 | Serpa |
| 7,890,768 B2 | 2/2011 | Singh et al. |
| 8,140,854 B2 | 3/2012 | Ogawa |
| 8,272,040 B2 | 9/2012 | Chaudhry et al. |
| 8,578,476 B2 | 11/2013 | Sama |
| 8,667,280 B2 | 3/2014 | Sama |
| 8,918,836 B2 | 12/2014 | Schechter et al. |
| 9,172,697 B1* | 10/2015 | Holtz ............... H04L 63/083 |
| 9,237,150 B2 | 1/2016 | Yun et al. |
| 9,524,395 B2 | 12/2016 | Selander et al. |
| 9,536,067 B1* | 1/2017 | Lee ................... G06F 21/31 |
| 9,600,658 B2 | 3/2017 | Kanzaki et al. |
| 9,606,983 B1 | 3/2017 | Mcclintock et al. |
| 9,626,494 B2 | 4/2017 | Milya |
| 9,626,506 B1 | 4/2017 | Shetty et al. |
| 9,632,603 B2 | 4/2017 | Fang et al. |
| 9,722,966 B2 | 8/2017 | Pandya et al. |
| 9,722,996 B1* | 8/2017 | Kolman ............. H04L 63/083 |
| 9,736,147 B1* | 8/2017 | Mead ................. G06F 21/31 |
| 9,864,783 B1 | 1/2018 | Mittleman |
| 9,876,782 B2 | 1/2018 | Holtz |
| 9,946,867 B1 | 4/2018 | Ramalingam et al. |
| 10,091,188 B2* | 10/2018 | Xiao .................. G06F 21/31 |
| 10,262,129 B1 | 4/2019 | Gupta |
| 10,284,547 B2 | 5/2019 | Holtz |
| 10,326,798 B2 | 6/2019 | Lambert |
| 10,395,065 B2 | 8/2019 | Kong et al. |
| 10,540,492 B1 | 1/2020 | Norris, Iii |
| 10,708,058 B2 | 7/2020 | Le Scouarnec et al. |
| 10,812,482 B1* | 10/2020 | Xu .................. G06F 21/604 |
| 10,866,699 B1 | 12/2020 | Hassan et al. |
| 11,055,394 B2 | 7/2021 | Norris, Iii |
| 11,240,227 B2 | 2/2022 | Hassan et al. |
| 2002/0029341 A1* | 3/2002 | Juels ............... H04L 63/083 |
| | | 713/184 |
| 2002/0108046 A1* | 8/2002 | Armingaud .......... G06F 21/316 |
| | | 713/183 |
| 2002/0144158 A1 | 10/2002 | Hekimian |
| 2003/0078949 A1 | 4/2003 | Scholz et al. |
| 2003/0172281 A1 | 9/2003 | Lee |
| 2004/0120438 A1 | 6/2004 | Forte |
| 2005/0154926 A1 | 7/2005 | Harris |
| 2005/0210255 A1 | 9/2005 | Kirovski |
| 2005/0273625 A1 | 12/2005 | Dayan et al. |
| 2006/0241904 A1 | 10/2006 | Middleton |
| 2006/0294392 A1 | 12/2006 | Veprek et al. |
| 2008/0066167 A1* | 3/2008 | Andri ................ G06F 21/31 |
| | | 726/5 |
| 2008/0320310 A1 | 12/2008 | Florencio et al. |
| 2009/0037992 A1* | 2/2009 | Smith ................ G06F 21/34 |
| | | 726/6 |
| 2009/0064278 A1* | 3/2009 | Harris ............... G06F 21/46 |
| | | 726/2 |
| 2009/0106825 A1 | 4/2009 | Cerruti et al. |
| 2009/0106827 A1* | 4/2009 | Cerruti .............. G06F 21/83 |
| | | 726/7 |
| 2009/0282062 A1 | 11/2009 | Husic |
| 2010/0057709 A1 | 3/2010 | Kawanaka et al. |
| 2010/0192205 A1* | 7/2010 | Chaudhry ........... H04L 63/083 |
| | | 726/5 |
| 2011/0225638 A1 | 9/2011 | Nahari |
| 2011/0271118 A1 | 11/2011 | Mahmoud et al. |
| 2012/0304302 A1* | 11/2012 | Stecher ............. G06F 21/84 |
| | | 726/26 |
| 2013/0061298 A1* | 3/2013 | Longobardi .......... G06F 21/42 |
| | | 726/6 |
| 2013/0152193 A1* | 6/2013 | Cheng ............. H04L 63/0838 |
| | | 726/19 |
| 2013/0238903 A1 | 9/2013 | Mizunuma |
| 2013/0254875 A1* | 9/2013 | Sama ................ G06F 21/31 |
| | | 726/19 |
| 2013/0273421 A1 | 10/2013 | Matsumura |
| 2013/0283337 A1 | 10/2013 | Schechter et al. |
| 2013/0333007 A1 | 12/2013 | Chougle et al. |
| 2013/0333010 A1 | 12/2013 | Chougle et al. |
| 2014/0101744 A1* | 4/2014 | Liu .................. G06F 21/36 |
| | | 726/7 |
| 2014/0165169 A1 | 6/2014 | Buck |
| 2014/0165175 A1 | 6/2014 | Sugiyama |
| 2014/0223189 A1* | 8/2014 | Gao ................. G06F 21/84 |
| | | 726/19 |
| 2014/0245433 A1* | 8/2014 | Bao .................. G06F 21/31 |
| | | 726/19 |
| 2014/0281506 A1 | 9/2014 | Redberg et al. |
| 2014/0310805 A1 | 10/2014 | Kandekar |
| 2014/0317705 A1* | 10/2014 | Eluard ............... G06F 21/31 |
| | | 726/6 |
| 2014/0365782 A1* | 12/2014 | Beatson ............ G06V 30/1478 |
| | | 713/186 |
| 2014/0373088 A1* | 12/2014 | Aggarwal ........... G06F 21/46 |
| | | 726/1 |
| 2015/0172273 A1 | 6/2015 | Dong et al. |
| 2015/0172275 A1 | 6/2015 | Milya |
| 2015/0294109 A1* | 10/2015 | Kanzaki ............. G06F 21/46 |
| | | 726/18 |
| 2015/0312040 A1 | 10/2015 | Zheng |
| 2015/0317469 A1* | 11/2015 | Liu .................. G06F 21/36 |
| | | 726/19 |
| 2015/0324579 A1 | 11/2015 | Qian et al. |
| 2015/0363593 A1 | 12/2015 | Joye |
| 2016/0021094 A1* | 1/2016 | Dong ................. G06F 21/36 |
| | | 713/183 |
| 2016/0050209 A1* | 2/2016 | Govande ............ H04L 63/101 |
| | | 726/7 |
| 2016/0078216 A1* | 3/2016 | Chougle ............. G06F 21/31 |
| | | 726/26 |
| 2016/0080356 A1 | 3/2016 | Chougle et al. |
| 2016/0125182 A1* | 5/2016 | Miura ............... G06F 21/46 |
| | | 726/18 |
| 2017/0185806 A1* | 6/2017 | Kong ................. G06F 21/45 |
| 2017/0207909 A1 | 7/2017 | Whatmough et al. |
| 2017/0208091 A1 | 7/2017 | Whitsell et al. |
| 2017/0272100 A1 | 9/2017 | Yanovsky et al. |
| 2017/0351659 A1 | 12/2017 | Amend et al. |
| 2017/0373858 A1 | 12/2017 | Mandal et al. |
| 2018/0054311 A1 | 2/2018 | Takeo |
| 2018/0089404 A1* | 3/2018 | Uchida .............. G06F 3/0488 |
| 2018/0097794 A1* | 4/2018 | Brown .............. H04L 63/083 |
| 2018/0114003 A1 | 4/2018 | Uenishi |
| 2018/0159679 A1 | 6/2018 | De Ruijter et al. |
| 2018/0191702 A1 | 7/2018 | Padmanabhan et al. |
| 2018/0278421 A1* | 9/2018 | Karabina ............ G09C 1/00 |
| 2019/0080060 A1 | 3/2019 | Lee |
| 2019/0103955 A1 | 4/2019 | Lee et al. |
| 2019/0141022 A1* | 5/2019 | Reeve ............... G06F 21/31 |
| 2019/0236262 A1 | 8/2019 | Yamada |
| 2019/0272370 A1* | 9/2019 | Hassan .............. G06F 21/46 |
| 2019/0379653 A1* | 12/2019 | Mead ............... H04L 63/1408 |
| 2020/0137038 A1* | 4/2020 | Endler .............. H04L 63/1425 |
| 2020/0387592 A1 | 12/2020 | Hassan et al. |
| 2020/0389441 A1 | 12/2020 | Hassan et al. |
| 2020/0389442 A1 | 12/2020 | Hassan |
| 2020/0389444 A1 | 12/2020 | Hassan et al. |
| 2020/0389445 A1 | 12/2020 | Hassan et al. |
| 2020/0389446 A1 | 12/2020 | Hassan et al. |
| 2021/0021372 A1 | 1/2021 | Hassan et al. |
| 2021/0021420 A1 | 1/2021 | Hassan et al. |
| 2021/0036898 A1 | 2/2021 | Hassan et al. |
| 2021/0157900 A1* | 5/2021 | Sethi ................ G06F 21/46 |
| 2022/0131849 A1* | 4/2022 | Rozenbaum ......... H04L 63/102 |

FOREIGN PATENT DOCUMENTS

| | | |
|---|---|---|
| CN | 101620656 A | 1/2010 |
| CN | 101702191 A | 5/2010 |
| CN | 103650411 A | 3/2014 |

(56) References Cited

FOREIGN PATENT DOCUMENTS

| | | | |
|---|---|---|---|
| CN | 104143068 A | 11/2014 |
| CN | 104424427 A | 3/2015 |
| CN | 105100035 A | 11/2015 |
| CN | 105224236 A | 1/2016 |
| CN | 105871889 A | 8/2016 |
| CN | 105975848 A | 9/2016 |
| CN | 106027804 A | 10/2016 |
| CN | 106656476 A | 5/2017 |
| CN | 107111479 A | 8/2017 |
| CN | 107292205 A | 10/2017 |
| CN | 107590381 A | 1/2018 |
| CN | 108154017 A | 6/2018 |
| CN | 108319874 A | 7/2018 |
| CN | 110073697 A | 7/2019 |
| EP | 1050986 A2 | 11/2000 |
| FR | 2862144 A1 | 5/2005 |
| GB | 2541040 A | 2/2017 |
| GB | 201522528 A | 2/2017 |
| JP | 2011113523 A | 6/2011 |
| JP | 2012133717 A | 7/2012 |
| SG | 11201806117T A | 8/2018 |
| WO | 2004021108 A2 | 3/2004 |
| WO | 2008082354 A1 | 7/2008 |
| WO | 2017123631 A1 | 7/2017 |

OTHER PUBLICATIONS

Lu, Chris Xiaoxuan, et al. "Snoopy: Sniffing your smartwatch passwords via deep sequence learning." Proceedings of the ACM on Interactive, Mobile, Wearable and Ubiquitous Technologies 1.4 (2018): 1-29. (Year: 2018).*
K. Alghathbar and H. A. Mahmoud, "Noisy password scheme: A new one time password system," 2009 Canadian Conference on Electrical and Computer Engineering, St. John's, NL, Canada, 2009, pp. 841-846. (Year: 2009).*
Alghathbar, et al., "Noisy Password Security Technique", In the Proceedings of International Conference for Internet Technology and Secured Transactions, Nov. 9, 2009, 5 Pages.
Florencio, et al., "KLASSP: Entering Passwords on a Spyware Infected Machine Using a Shared-Secret Proxy", In The Proceedings of 22nd Annual Computer Security Applications Conference, Dec. 11, 2006, 10 Pages.
"International Search Report and Written Opinion Issued in PCT Application No. PCT/US20/030319", Mailed Date: Jul. 3, 2020, 11 Pages.
"International Search Report and Written Opinion Issued in PCT Application No. PCT/US20/030331", Mailed Date: Jul. 24, 2020, 13 Pages.
Chatterjee, et al., "The TypTop System: Personalized Typo-Tolerant Password Checking", In Proceedings of the ACM SIGSAC Conference on Computer and Communications Security, Oct. 30, 2017, pp. 1-20.
"International Search Report and Written Opinion issued in PCT Application No. PCT/US20/033475", Mailed Date: Aug. 28, 2020, 11 Pages.
"Non Final Office Action issued in U.S. Appl. No. 16/514,747", Mailed Date: Jul. 8, 2021, 13 Pages.
"Use of Input Distance Metric to Implement Fuzzy Password Matching", Published by IP.Com Electronic Publication, Apr. 2, 2015, 2 Pages.
Gomaa, et al., "A Survey of Text Similarity Approaches", In International Journal of Computer Applications, vol. 68, Issue 13, Apr. 1, 2013, pp. 13-18.
Mark, et al., "The Stringdist Package for Approximate String Matching", Published in The R Journal, vol. 6, Issue 1, Jun. 1, 2014, pp. 111-122.
"International Search Report and Written Opinion Issued in PCT Application No. PCT/US20/029991", Mailed Date: Jul. 31, 2020, 11 Pages.

"International Search Report and Written Opinion Issued In PCT Application No. PCT/US20/029992", Mailed Date: Jul. 31, 2020, 11 Pages.
"International Search Report and Written Opinion Issued in PCT Application No. PCT/US20/036865", Mailed Date: Sep. 23, 2020, 12 Pages.
"International Search Report & Written Opinion Issued in PCT Application No. PCT/US20/029993", Mailed Date: Apr. 23, 2021, 8 Pages.
"Non Final Office Action Issued in U.S. Appl. No. 16/436,809", Mailed Date: Mar. 6, 2020, 19 Pages.
Alsaiari, Hussain S."Graphical One-Time Password Authentication", In Thesis of Plymouth University, May 2016, 460 Pages.
Forget, et al. "Persuasion for Stronger Passwords: Motivation and Pilot Study", In Proceedings of the 3rd international conference on Persuasive Technology, Jun. 4, 2008, pp. 140-150.
Griffin, Phillip H. "Secure Authentication on the Internet of Things", In Proceeding of SoutheastCon, Mar. 30, 2017, 5 Pages.
"Notice of Allowance Issued in U.S. Appl. No. 16/436,809", Mailed Date: Jul. 10, 2020, 24 Pages.
Alghathbar, et al., "Noisy Password Scheme: A New One Time Password System", In Canadian Conference on Electrical and Computer Engineering, May 3, 2009, pp. 841-846.
"International Search Report and Written Opinion Issued in PCT Application No. PCT/US2020/030317", Mailed Date: Jun. 23, 2020, 11 Pages.
"International Search Report and Written Opinion Issued in PCT Application No. PCT/US2020/030318", Mailed Date: Jun. 24, 2020, 11 Pages.
"Non Final Office Action Issued in U.S. Appl. No. 16/436,728", Mailed Date: Mar. 18, 2021, 24 Pages.
"Non Final Office Action Issued In U.S. Appl. No. 16/436,750", Mailed Date: Jun. 14, 2021, 26 Pages.
"Non Final Office Action Issued In U.S. Appl. No. 16/436,679", Mailed Date: Jun. 24, 2021, 23 Pages.
"Non Final Office Action Issued In U.S. Appl. No. 16/436,745", Mailed Date: Jun. 29, 2021, 17 Pages.
"Notice of Allowance Issued in U.S. Appl. No. 16/436,750", Mailed Date: Sep. 28, 2021, 10 Pages.
Gutierrez, et al., "Inhibiting and Detecting Offline Password Cracking using ErsatzPasswords", In ACM Transactions on Privacy and Security, vol. 19, Issue 3, Dec. 12, 2016, 30 Pages.
Mayer, et al., "I (Don't) See What You Typed There! Shoulder-Surfing Resistant Password Entry on Gamepads", In Proceedings of the CHI Conference on Human Factors in Computing Systems, May 4, 2019, 12 Pages.
Riesen, et al., "Sketch-Based User Authentication With a Novel String Edit Distance Model", In IEEE Transactions on Systems, Man, and Cybernetics: Systems, vol. 48, Issue 3, Mar. 2018, pp. 460-472.
"Non Final Office Action Issued in U.S. Appl. No. 16/436,688", Mailed Date: Aug. 5, 2021, 21 Pages.
Luo, et al., "A Mobile Authentication System Resists to Shoulder-Surfing Attacks", In Journal of Multimedia Tools and Applications, Dec. 8, 2015, pp. 14075-14087.
"International Search Report and Written Opinion Issued in PCT Application No. PCT/US20/030315", Mailed Date: Aug. 10, 2020, 16 Pages.
"Final Office Action Issued in U.S. Appl. No. 16/514,747", Mailed Date: Dec. 13, 2021, 16 Pages.
"Non-Final Office Action Issued in U.S. Appl. No. 16/436,802", Mailed Date: Feb. 28, 2022, 13 Pages.
"Final Office Action Issued in U.S. Appl. No. 16/436,688", Mailed Date: Mar. 15, 2022, 27 Pages.
"Non Final Office Action Issued in U.S. Appl. No. 16/436,745", Mailed Date: May 2, 2022, 14 Pages.
"Notice of Allowance Issued in European Patent Application No. 20726607.3", Mailed Date: Nov. 25, 2022, 7 Pages.
"Notice of Allowance Issued in European Patent Application No. 20726608.1", Mailed Date: Nov. 30, 2022, 7 Pages.
"Non Final Office Action Issued in U.S. Appl. No. 16/436,688", Mailed Date: Jul. 12, 2022, 26 Pages.

(56) References Cited

OTHER PUBLICATIONS

"Notice of Allowance Issued in U.S. Appl. No. 16/436,745", Mailed Date: Jul. 21, 2022, 9 Pages.
"Notice of Allowance Issued in U.S. Appl. No. 16/436,802", Mailed Date: Aug. 10, 2022, 9 Pages.
"First Office Action and Search Report Issued in Chinese Patent Application No. 202080042414.4", Mailed Date : Mar. 1, 2023, 15 Pages.
"First Office Action and Search Report Issued in Chinese Patent Application No. 202080042472.7", Mailed Date: Mar. 1, 2023, 7 Pages.
"First Office Action and Search Report Issued in Chinese Patent Application No. 202080042650.6", Mailed Date: Mar. 1, 2023, 14 Pages.
"Notice of Allowance Issued in European Patent Application No. 20726607.3", Mailed Date: Mar. 2, 2023, 2 Pages.
Examination Report Received for Indian Application No. 202247000121, mailed on Mar. 4, 2024, 08 pages.
Examination Report Received for Indian Application No. 202247000332, mailed on Mar. 1, 2024, 08 pages.
Examination Report Received for Indian Application No. 202247000414, mailed on Mar. 4, 2024, 08 pages.
First Office Action Received for Chinese Application No. 202080054743.0, mailed on Feb. 29, 2024, 14 pages.
Office Action Received for India Application No. 202247000411, mailed on Sep. 12, 2023, 09 pages.
Decision to grant a European patent pursuant to Article 97(1) Received for European Application No. 20727027.3, mailed on Feb. 29, 2024, 2 pages.
EPO Decision to grant received in European Application No. 20727026.5, mailed on Feb. 15, 2024, 2 pages.
First Examination Report Received for Indian Application No. 202247000190, mailed on Feb. 1, 2024, 7 pages.
Notice of Granting Patent Right for Invention received in Chinese Application No. 202080042414.4 mailed on Sep. 12, 2023, 4 pages (English Translation Provided).
Office Action Received for Chinese Application No. 202080042411.0, mailed on Oct. 30, 2023, 16 pages (English Translation Provided).
Office Action Received for Chinese Application No. 202080042411.0, mailed on Feb. 6, 2024, 16 pages (English Translation Provided).
Office Action received for Chinese Application No. 202080042650.6, mailed on Dec. 21, 2023, 11 pages (English Translation Provided).
Office Action Received for European Application No. 20727025.7, mailed on Oct. 2, 2023, 4 pages.
Office Action Received for India Application No. 202247000411, mailed on Dec. 9, 2023, 09 pages.
Office Action Received for Chinese Application No. 202080042411.0, mailed on Apr. 17, 2024, 19 pages (English Translation Provided).
EPO Notification Rule 94(3) received in European Application No. 20842746.8, mailed on Jun. 11, 2024, 6 pages.
Communication pursuant to Article 94(3) received in European Application No. 20727028.1, mailed on May 7, 2024, 8 pages.
Communication pursuant to Article 94(3) received in European Application No. 20750535.5, mailed on Apr. 26, 2024, 8 pages.
Kaiser, et al., "Undetected Errors in Quasi-Cyclic LDPC Codes Caused by Receiver Symbol Slips", In Proceedings of IEEE Global Telecommunications Conference, Nov. 30, 2009, 6 Pages.
Notice of Granting Patent Right for Invention received in Chinese Application No. 202080042440.7, mailed on Dec. 26, 2023, 4 pages (English Translation Provided).
Notice of Granting Patent Right for Invention received in Chinese Application No. 202080042472.7, mailed on Jul. 28, 2023, 4 pages (English Translation Provided).
Office Action received for Chinese Application No. 202080042440.7, mailed on Mar. 29, 2023, 12 pages (English Translation Provided).
Office Action received in Chinese Application No. 202080042650.6, mailed on Sep. 29, 2023, 11 pages (English Translation Provided).
Subbagh, et al., "Optimum patterns for frame alignment", Institution of Electrical Engineers. Stevenage, vol. 135, No. 6, Dec. 1, 1988, pp. 594-603.
Guo, et al., "LPSE: Lightweight password-strength estimation for password meters", Computers & Security, Jul. 12, 2017, 18 pages.
Summons to attend oral proceedings pursuant to Rule 115(1) Received in European Patent Application No. 20750535.5, mailed on Oct. 2, 2024, 6 pages.

\* cited by examiner

PLEASE ENTER YOUR CREDENTIALS TO LOGIN

USERNAME

PASSWORD

SUBMIT

*FIG. 7*

PLEASE ENTER YOUR CREDENTIALS TO LOGIN

USERNAME  USER1234@ABC.COM

PASSWORD  ****

WARNING! THIS SYSTEM REQUIRES NOISE CHARACTERS. NO NOISE CHARACTERS DETECTED

SUBMIT

*FIG. 8A*

PLEASE ENTER YOUR CREDENTIALS TO LOGIN

USERNAME  USER1234@ABC.COM

PASSWORD  ******

WARNING! THIS SYSTEM REQUIRES A FIXED LENGTH ENTRY. ENTRY IS INVALID SIZE.

SUBMIT

*FIG. 8B*

PLEASE ENTER YOUR CREDENTIALS TO LOGIN

USERNAME  USER1234@ABC.COM

PASSWORD  *********

WARNING! THIS SYSTEM REQUIRES A SUBSET OF YOUR PASSWORD TO BE ENTERED. INVALID ENTRY, SUBSET MISSING OR ENTIRE PASSWORD PRESENT

SUBMIT

*FIG. 8C*

AUTHENTICATION WITH RANDOM NOISE SYMBOLS AND PATTERN RECOGNITION

BACKGROUND

Users attempting to access secured access-controlled resources perform an authentication attempt whereby the user enters one or more credentials such as a username and a password. The entered credentials are compared with stored credentials to determine whether the username and password match a valid account that is authorized to access the secured access-controlled resources. If the credentials match a valid account that is authorized to access the secured access-controlled resources, the system may grant access to the access-controlled resource.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 7 and 8A-8C illustrate diagrams of an example graphical user interface (GUI) for allowing a user to enter authentication credentials according to some examples of the present disclosure.

DETAILED DESCRIPTION

Figure 1:
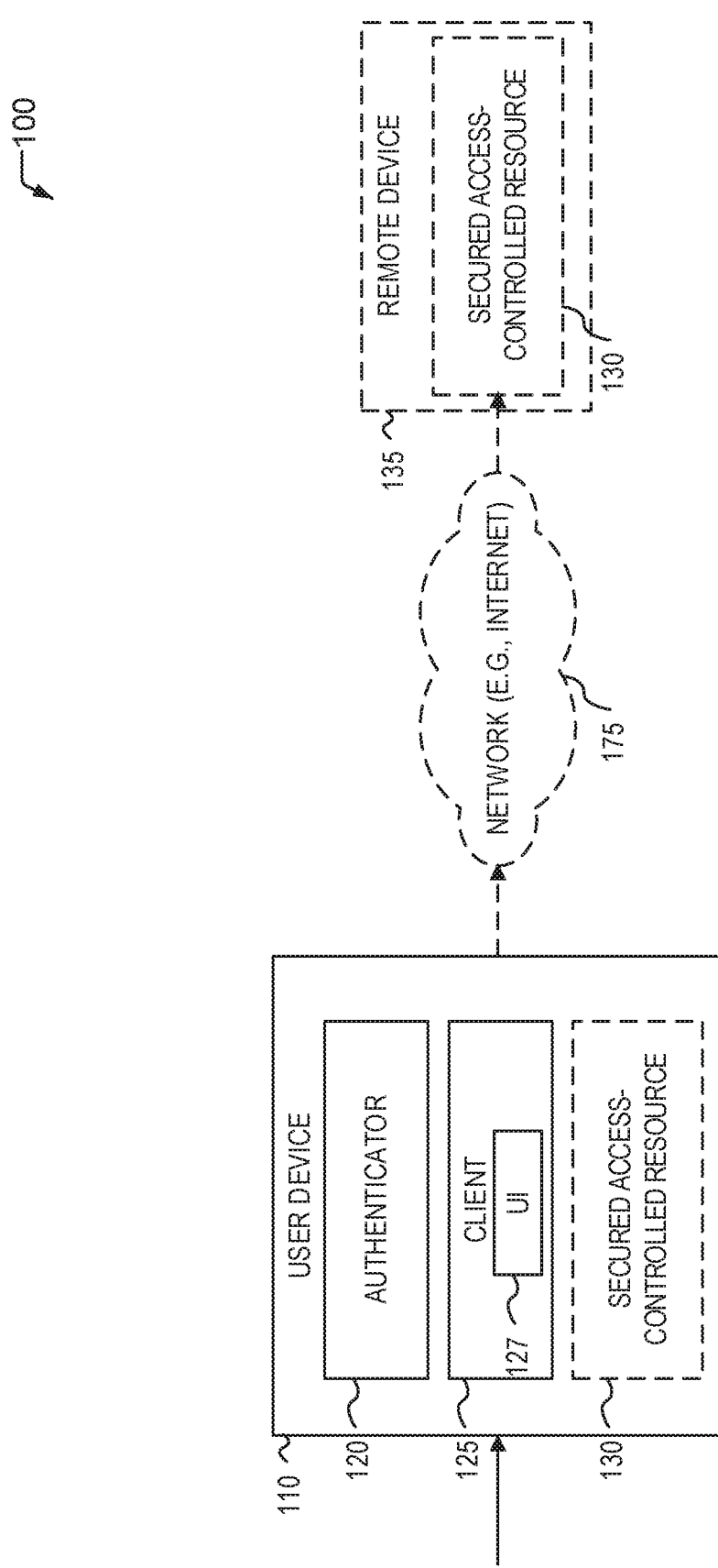
FIG. 1 illustrates an example authentication environment in which a user of a user device may authenticate to access a secured access-controlled resource according to some examples of the present disclosure.

FIG. 1 illustrates an example authentication environment 100 in which a user of a user device 110 may authenticate to access a secured access-controlled resource 130 according to some examples of the present disclosure. As shown in FIG. 1, the secured access-controlled resource 130 may be a secured access-controlled resource 130 of the user device 110 or a secured access-controlled resource 130 that is provided by a remote device 135 that is accessible over a network 175. Secured access-controlled resource 130 may include access to one or more files, portions of files (e.g., fields or data structures), applications, access to an operating system, access to the user device 110 itself, access to one or more network-based services (e.g., social networking services, file sharing services, email, communications services, and the like), access to a physical object (e.g., through the unlocking of the object by computer control), or the like.

Network 175 may include any computing network, including a local area network (LAN), wide area network (WAN), the Internet, or the like. At the user device 110, the user makes an authenticate attempt on requesting access to the secured access-controlled resource 130. An authentication attempt is an attempt by a user to demonstrate possession of valid credentials to access the secured access-controlled resource. As part of the authentication attempt, the client 125 may cause a user interface (UI) 127 (which may be a graphical UI (GUI)) to be displayed which requests credentials of the user that are required to access the secured access-controlled resource 130. Example credentials include a username, a password, a biometric, a token, a digital certificate, an encryption key, or the like.

The client 125 may then pass the credentials entered by the user to the authenticator 120. The authenticator 120 may determine whether the credentials entered by the user are valid. If they are valid, the authenticator 120 may grant access to the secured access-controlled resource 130. If the credentials are not valid, the authenticator 120 may deny access to the secured access-controlled resource 130. If the secured access-controlled resource 130 is controlled by the remote device 135, the authenticator 120 may send a message across network 175 to indicate to the remote device 135 whether the user is authorized to access the secured access-controlled resource. Client 125 may then inform the user via UI 127 whether access was granted or not.

Figure 2:
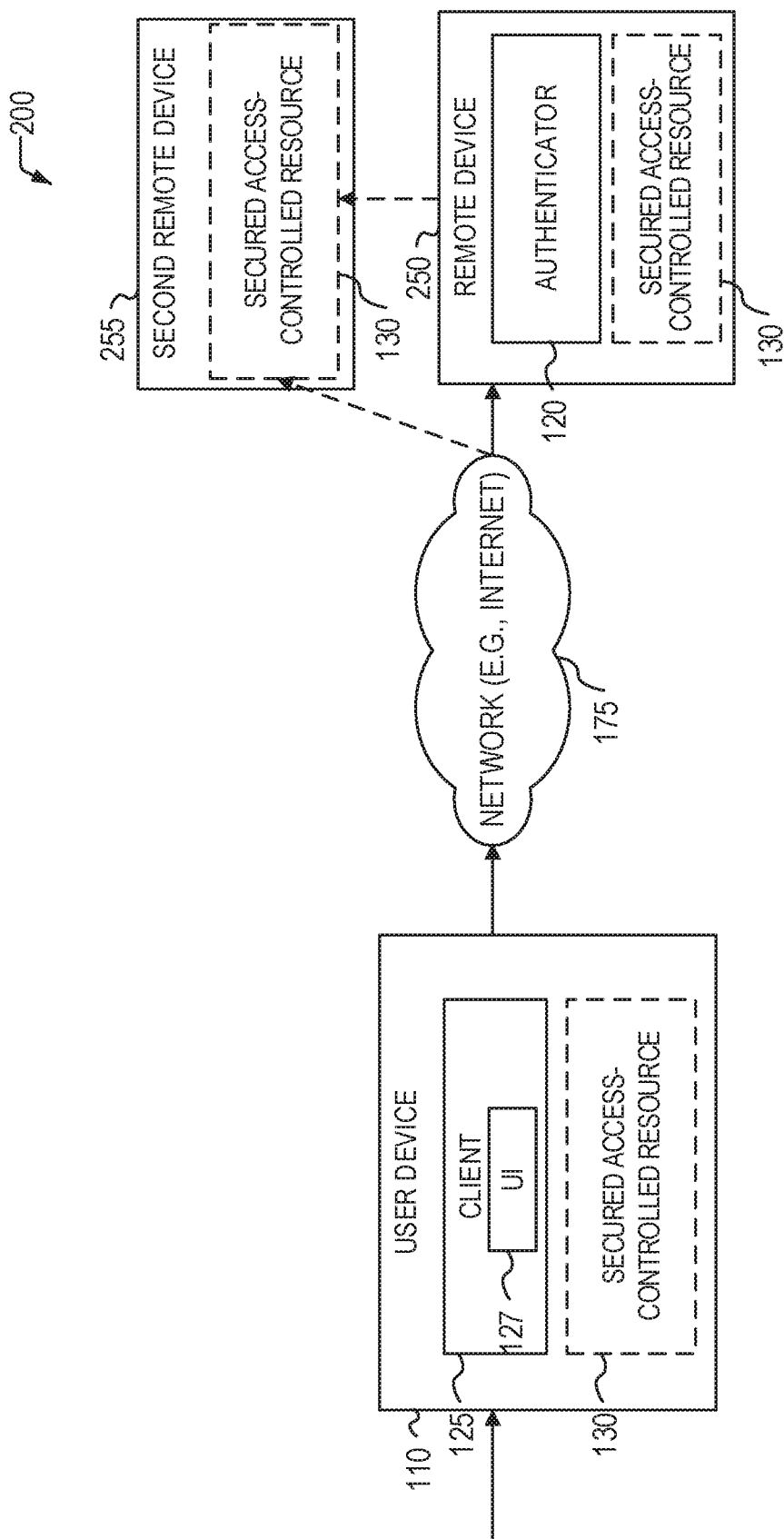
FIG. 2 illustrates an example authentication environment in which a user may authenticate to access a secured access-controlled resource according to some examples of the present disclosure.

FIG. 2 illustrates an example authentication environment 200 in which a user utilizing a user device 110 may authenticate to access a secured access-controlled resource 130 according to some examples of the present disclosure. FIG. 2 is similar to FIG. 1, except the authenticator 120 is located on a remote device 250. A user enters the credentials via the UI 127 of client 125 as in FIG. 1. In some examples, the UI may be provided entirely by the client 125, but in other examples, the UI may be provided partially by the remote device 250 (e.g., via one or more files that are transmitted by the remote device 250 and rendered by the client 125 to create the UT 127). The client transmits the credentials via the network 175 to authenticator 120 of remote device 250. The credentials may be encrypted when transmitted across network 175, for example, by utilizing Secure Socket Layer connections.

In the example of FIG. 2, the secured access-controlled resource 130 may reside at user device 110, remote device 250, or second remote device 255. Authenticator 120 may send an indication to the device on which the secured access-controlled resource 130 is located to indicate whether the user is authenticated or not—either directly, or through the client 125. In some examples, the indication may be a direct message to the device (e.g., such as user device 110 or second remote device 255). In other examples, the authenticator 120 may issue a token to client 125 if the user successfully authenticates. This token may be sent by the user device 110 to whatever device the secured access-controlled resource 130 is on. The device (e.g., 110, 250, or 255) then verifies the token and grants the user access to the secured access-controlled resource if the token is verified.

In traditional authentication systems, users type in a credential that is checked against a stored credential (or otherwise verified) to determine if the entered credential is an exact match to the stored credential. While requiring an exact match is, in traditional authentication systems, the most secure verification method to prevent against hackers that are trying to guess the credential by using brute-force attacks, requiring an exact match may be problematic for remote authentication as noise may be introduced by the communication channel which may cause a failed authentication. Further, exact match systems present security vulnerabilities as they expose the exact credential of the user to eavesdroppers. For example, security vulnerabilities may result from nefarious users that eavesdrop on a legitimate user's keyboard as they type in their password (so-called shoulder surfers), use keyloggers that directly steal data from a user's keyboard, or use man-in-the middle attacks that intercept communications such as credentials that may be sent to servers. In systems requiring an exact match for the user's credentials, an eavesdropper need only intercept a single authentication attempt to compromise a user's account.

To better secure against these eavesdropping attacks, some exact match authentication systems require entry of one or more noise symbols interspersed with legitimate credential symbols. Noise symbols are one or more symbols that are not part of the user's credential and are not checked against the stored credential to determine whether there is a match with the user's stored credential, A symbol is one or more data units, such as a character, a byte, a word, or the like. The device that authenticates the password removes these noise symbols to check for an exact match with the stored credential. These techniques may defeat shoulder surfers that attempt to spy a user's password by watching the characters the user types. In addition, certain keyloggers that monitor keys typed by a user or man-in-the middle attackers that intercept a user's communications may also be prevented from determining the user's password by the addition of noise characters in the password as it may take multiple observations to discern the user's real password.

Authenticators in authentication systems that introduce noise symbols in the credential typically need to filter out the noise symbols in the credential before checking for an exact match. To accomplish this, the authenticator must know which symbols are noise symbols and which are part of the credential. In some examples, authentication systems introduce noise symbols at positions of the credential that are specified for all authentication attempts. For example, the authentication system may specify that all authentication attempts must put noise symbols at the beginning, at the end, at both the beginning and end, or at other predetermined positions within the credential symbols. These positions do not change during a subsequent login attempt. That is, each login attempt utilizes extra noise symbols at one or one or more of these same positions.

In other examples, the authenticator (either on the user device or at a remote device) may specify, for a specific authentication attempt, that a user is to place noise symbols in specified positions of the credential. For example, the user may be instructed to insert three noise symbols N before the first, between the second and third, and between the fourth fifth symbols of a password P to produce submitted symbols of $\{N_1, P_1, P_2, N_2, P_3, P_4, N_3, P_5 \ldots P_m\}$ where in is the length of the password P. The symbols used for these noise symbols N may be specified by the authenticator or may be left to the user to decide when they type in the random characters. In some examples, the symbols may be characters and the credential may be a password, thus a user may insert noise characters within a password at specified character positions within the password.

The authenticator then strips out the noise symbols N from the submitted symbols. Authentication is easy to implement on these systems as exact knowledge of where the noise symbols are enables easy removal of those symbols and thus a direct comparison between the entered symbols and the stored credential is possible. These systems may not effectively solve the problems of eavesdropping of passwords because an eavesdropper may also be able to determine where in the password the noise is inserted and thus may be able to accurately remove the noise. For example, if the positions are displayed to a user, a shoulder-surfer would also be able to see which positions are noise symbols. In addition, if the authenticator is located remotely, the authenticator may send a message to the client device indicating where the user should insert noise. This message may be intercepted by a man-in-the middle attack. The potential ways in which attackers can access the specified positions make these systems less effective.

Disclosed in some examples are methods, systems and machine-readable mediums which allow for more secure authentication attempts by implementing authentication systems with credentials that include interspersed noise symbols. These systems which allow noise symbols N in positions determined by the user that are not specified to the authenticator for an authentication attempt produce higher amounts of security from eavesdroppers as there is no way for an eavesdropper to determine in advance where the noise symbols (e.g., characters) are. While these systems are more secure, they are not easy to authenticate. For example, since the position of the noise symbols is not known by the authenticator, it is not easy to ignore the noise symbols N to determine if the remaining characters match the password.

In the disclosed examples, the noise symbols (e.g., characters) and their positions within the credential are not specified for the particular authentication attempt by the system. The user may decide at the time of credential entry where to put the random noise symbols and what the random noise symbols are. The authenticator compares the submitted characters (the credential with the interspersed noise symbols) with the stored credential without knowledge of where the noise symbols are within the credential symbols and without knowledge of what symbols the noise symbols are.

To authenticate the user, the authenticator decomposes the submitted symbols into a plurality of vectors of length m that corresponds to the number of symbols in the valid credentials (e.g., a length of the password). An ordering of the symbols is maintained in each of the plurality of vectors such that the order of each symbol in the vector relative to the other symbol in the vector matches the ordering as received. A distance metric is then calculated that quantifies a distance between each vector and a vector comprising the symbols of the credential. Based on the distance metric, a determination may be made if the credential is matched and the user authenticated. In some examples, the credential is a password, and the symbols are characters.

The present disclosure thus solves a technical problem of providing secure access to access-controlled resources using one or more secure credentials (such as a password) that is resistant to keyloggers, eavesdroppers, and man-in-the middle attacks. This is accomplished through the introduction of user-specified noise symbols (e.g., characters) that are introduced at user-specified locations. The authenticator is not aware of where the noise symbols are introduced or what the noise symbols are. The authenticator decomposes the submitted symbols into a plurality of vectors and utilizes a distance metric to determine if authentication should be granted. In some examples, this method may secure against brute force attacks by limiting the number of authentication attempts a user can make by locking the user out of their account (permanently or temporarily) after a threshold number of unsuccessful login attempts.

Figure 3:
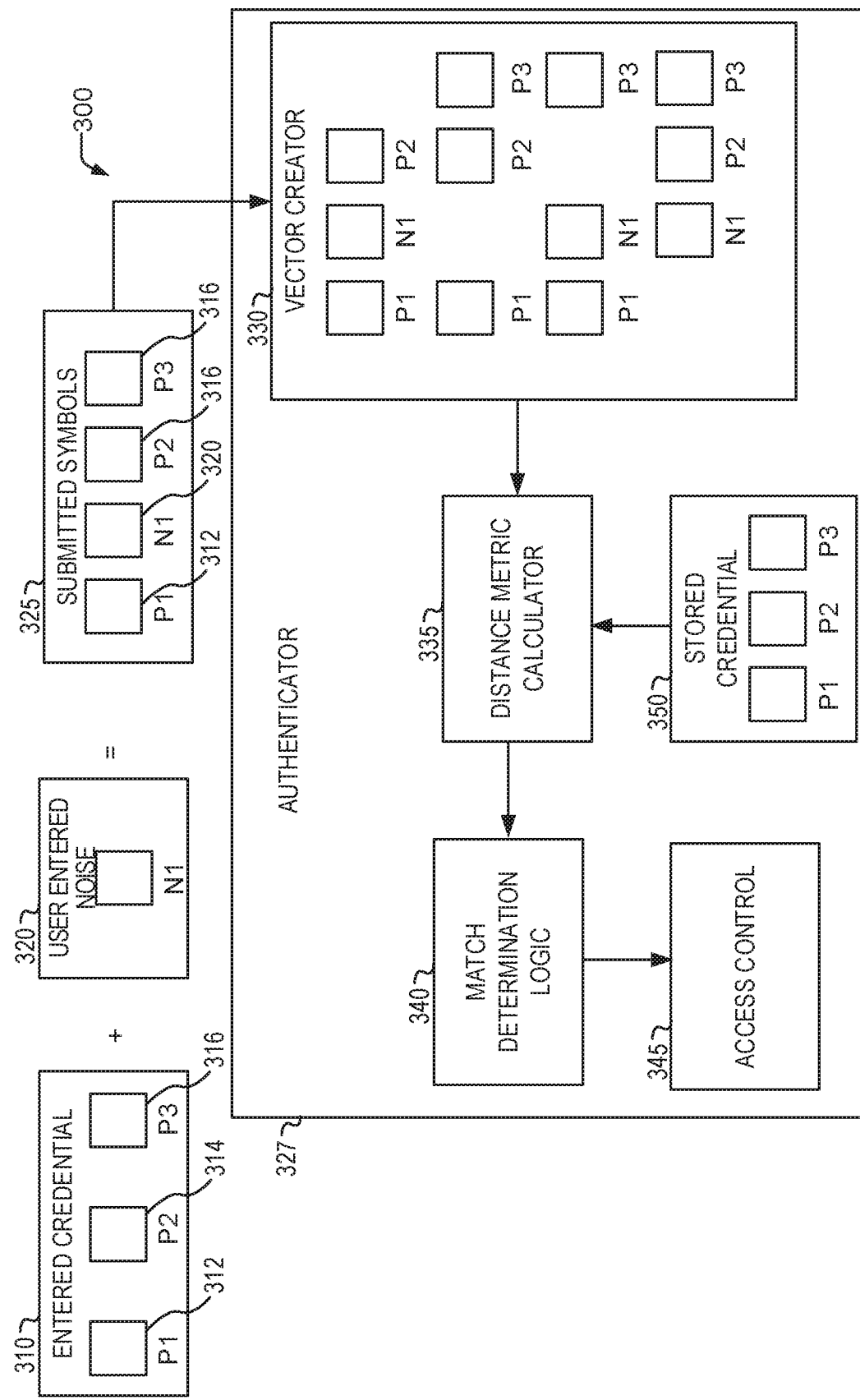
FIG. 3 illustrates a diagram of a data flow of an authentication with additional, unspecified noise symbols according to some examples of the present disclosure.

FIG. 3 illustrates a diagram of a data flow 300 of an authentication with additional, unspecified noise symbols according to some examples of the present disclosure. According to the example data flow 300, the entered credential 310 (e.g., password) may comprise three symbols 312, 314, and 316 {P1, P2, P3} in that order, that may be in the form of a character. The user, when entering the credential adds one or more noise symbols 320 in the form of noise characters to the credential. In the example shown in FIG. 3, for ease of description, only one noise symbol 320 is added. The submitted symbols 325 that are submitted by the user for authentication, includes the credential symbols 312, 314, and 316 (in order) along with the one or more noise symbols 320 inserted into the credential symbols.

The authenticator 327 includes a vector creator 330 that receives the submitted symbols 325 and creates a plurality of vectors of length iv, where in is a number of symbols of the stored credential 350 (e.g., password) of the user (e.g., a length of the valid password). The vectors reflect each of the possible in-order, length m combinations of the submitted symbols 325. The order of the characters in each of the vectors is a same order as an order of the symbols in the submitted symbols 325. That is, if the combined sequence is "p1as", and the credential is "pas" then the vectors would all be of length three and would reflect all the possible in-order (i.e., each character maintains the order it appeared in from the submitted symbols 325) combinations. In this example, the vectors would be: <p, 1, a>, <p, a, s>, <p, 1, s>, <1, a, s>

Each vector is then passed to a distance metric calculator 335 that calculates a distance between each of the vectors and a vector of the stored credential 350. In some examples, the distance metric may be a Levenshtein distance. In other examples, a distance metric may compare each symbol of each vector to the corresponding position in the stored credential 350. If the symbols match, then the score may not be incremented. If the symbols do not match, the score may be incremented. In other examples, a higher score reflects a better match and thus symbols that match may cause the score to be incremented and symbols that do not match may cause no change in the score or may cause the score to be decremented. In still other examples, the distance metric may be a correlation to the stored credential 350, such as a Pearson correlation coefficient. In other examples, other edit distance metrics or algorithms may be used.

The distance metrics for each of the vectors is then passed to the match determination logic 340. In some examples, the match determination logic 340 identifies the distance metric that signifies a closest match with the stored credential 350 (e.g., a smallest distance). This may be a highest score (in the case of assigning points for a match), or may be a lowest score, depending on the implementation desired. If the distance metric that signifies the closest match is closer than a threshold value to the stored credential 350 (e.g., the distance is smaller than a threshold), then the match determination logic 340 may return that a match is found. In an example, meeting the threshold value may require a perfect match. In other examples, the match determination logic identifies two distance metrics that signify the two closest matches with the stored credential 350 (e.g., a smallest distance and a second smallest distance), The match determination logic may then take the ratio of the two distance metrics and compare that to a threshold to determine whether there is a match. In some examples, the use of a threshold allows for authentication even when the entered credential 310 in the submitted symbols 325 is a less than perfect match for the sored credential 350. This may allow for some level of noise tolerance where symbols of the entered credential 310 are replaced by noise symbols during transmission.

Access control 345 may then grant or deny access to the secured access-controlled resource based on the result from match determination logic 340. For example, access control 345 may send a message to the computer device hosting the secured access-controlled resource to provide the results of the authentication attempt. In some examples, access control 345 may send a token to the user device or to the device hosting the secured access-controlled resource. In other examples, the access control 345 may provide the secured access-controlled resource. In some examples, the access control may send a signal to a physical device, which may provide access to a physical resource (e.g., unlock a door).

Figure 4:
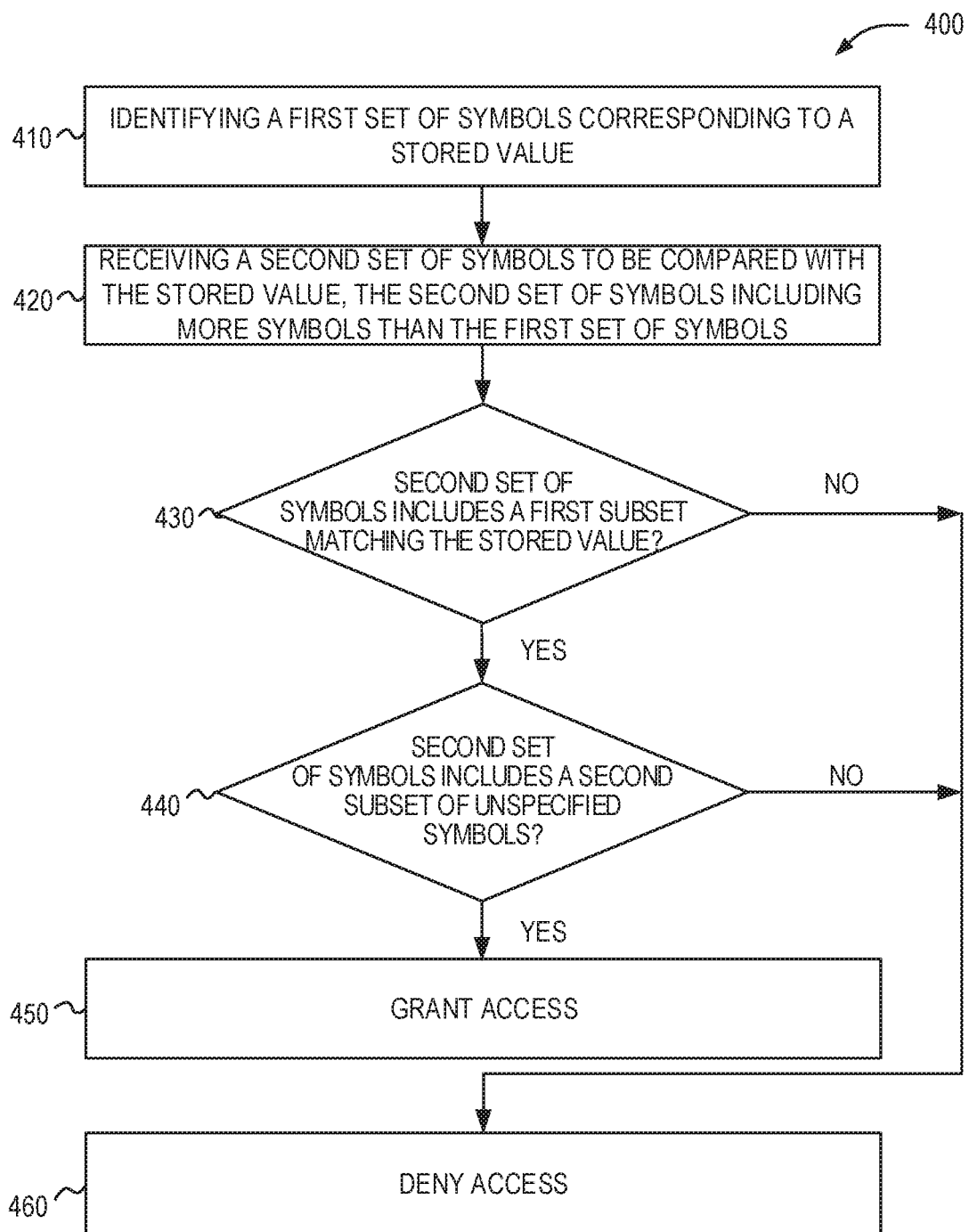
FIG. 4 illustrates a flowchart of a method of authenticating a user according to some examples of the present disclosure.

FIG. 4 illustrates a flowchart of a method 400 of authenticating a user according to some examples of the present disclosure. At operation 410 the authenticator identifies a first set of symbols (e.g., characters) corresponding to a stored value, such as a credential (e.g., a username, password, encryption key). As used herein, a symbol is a unit of data, such as a character, a word, a byte, or other group of data. At operation 420, the authenticator receives a second set of symbols (e.g., characters) to be compared with the stored value, the second set of symbols includes more symbols than the first set of symbols (e.g., noise characters). For example, the symbols may be entered credential symbols (e.g., a password) with additional noise symbols (e.g., characters) and the stored value may be a credential such as a password.

At operation 430 the authenticator determines if the second set of symbols includes a first subset of symbols matching the stored value. For example, the authenticator determines if the second set of characters includes a credential such as a password. If the second set of symbols does not include the stored value, then at operation 460, access may be denied. If the second set of symbols includes the stored value, then processing moves to operation 440. In some examples, to determine whether the second set of symbols includes the stored value the second set of symbols may be decomposed into a set of size m in-order vector combinations of the second set of values, where m is a number of symbols in the stored credential. The vectors reflect each of the possible in-order length m combinations of the submitted symbols. A distance metric may be calculated for each of the vectors that measures a distance between the stored value and each vector. The decision of whether the second set of symbols includes the stored value may be based on the distance metrics and whether at least one of the distance metrics is within a threshold distance of the stored value.

At operation 440, the authenticator determines whether the second set of symbols includes a second subset of unspecified symbols in one or more unspecified positions within the second set of symbols. For example, the authenticator determines whether noise characters are added to the password characters. In some examples, the authenticator may ensure that additional symbols are entered to ensure that the user is secured from eavesdropping attacks. If there are no additional noise symbols added, then at operation 460 access is denied. Otherwise, access may be granted at operation 450, It is noted that the authenticator does not specify for any authentication attempt where the noise symbols are to be placed, and what the noise symbols are. This protects the user by preventing eavesdropping of these locations.

Figure 5:
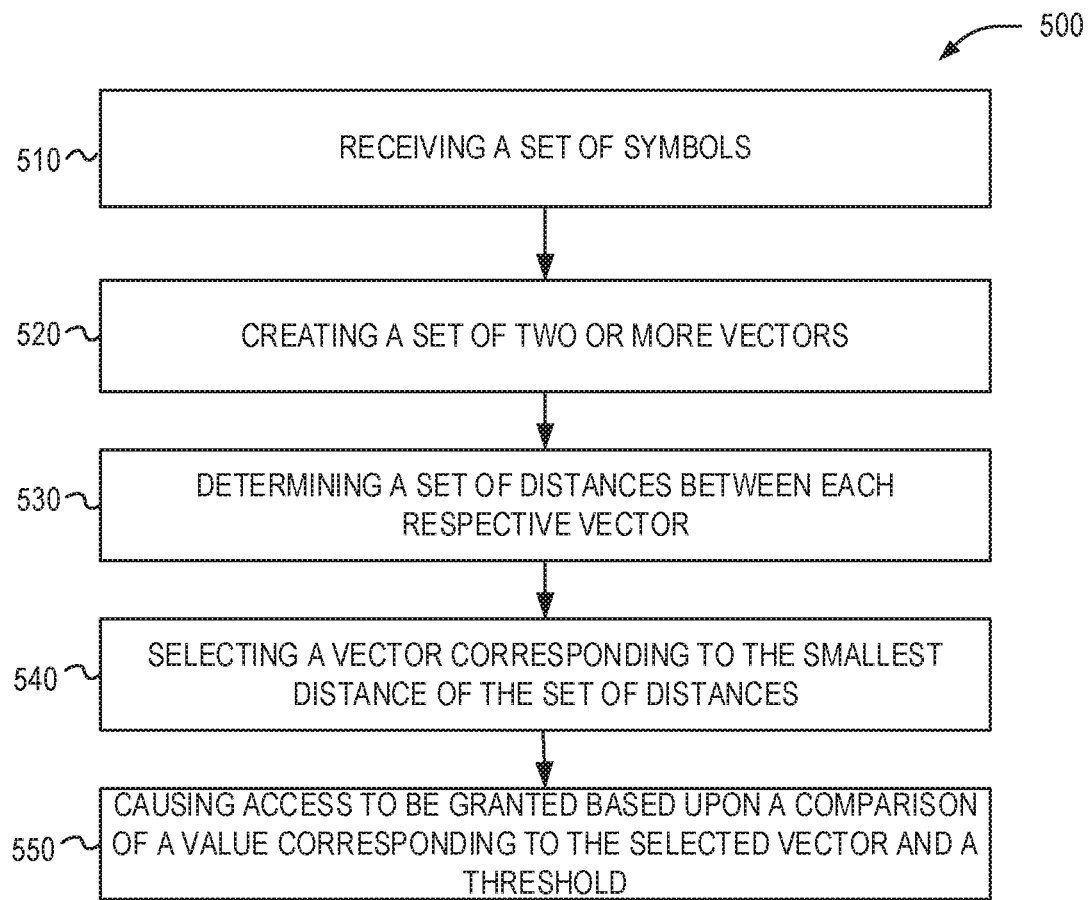
FIG. 5 illustrates a flowchart of a method of authenticating a user according to some examples of the present disclosure.

FIG. 5 illustrates a flowchart of a method 500 of authenticating a user according to some examples of the present disclosure. At operation 510, the authenticator receives a set of submitted symbols to be authenticated during the authentication attempt. In some examples, the symbols are characters. In some examples, the received set of symbols includes more symbols than a first set of symbols corresponding to a stored value (such as a credential). For example, the entered characters include noise characters. At operation 520, the authenticator creates a set of two or more vectors, each vector having a length corresponding to a length of an ordered vector comprising the first set of symbols corresponding to the stored value (e.g., the stored credential) and each vector comprising a different ordered combination of the received set of symbols, the different ordered combination of the received set of symbols ordered in a same order as the symbols were received. For example, if a received set of characters is {p,#,a,r,s,$} and the password (stored value) is {p,a,s,s} then a set of vectors of length 4 are created. In this example, the system would create a vector for each 4 character in-order combination of the received set of characters.

By in-order it is meant that the symbols in the vector maintain the ordering of the symbols in the submitted symbols relative to each other. Put differently, in the example above, if the character 'p' is in the vector, that character would always be first among the password characters (not considering noise symbols). An 'a' character in the vector would be either first (if 'p' was not in the vector) or second (if 'p' is in the vector) among the password characters (again, not considering noise symbols). So, in the above example, the following are valid vectors:

1. p #ar
2. #ars
3. arss
4. pars
5. prss
6. p #rs
7. pass
8. #rss
9. #ass
10. p #as
11. p #ss At operation 530, the authenticator may determine a set of distances between each respective vector and the ordered vector comprising the first set of symbols corresponding to the stored value. As previously noted, the set of distances may be determined by one or more distance metrics, such as a Levenshtein distance; a simple point total where points are added or subtracted based on differences in the symbols; or a statistical correlation. For example, a system utilizing a point value system may add a value of 1 to a score for symbol positions that do not match and a value of 0 to symbol positions that do match the stored value (e.g., the stored credential). In the example above, using this simple distance metric, the distances would be: {3, 2, 2, 1, 1, 2, 0, 2}. In still other examples, the vectors may simply be compared to the stored value to determine if there is a match. In yet additional examples, the distance metric may be a statistical correlation.

At operation 540, the system may select a vector of the set of vectors based on the distance of the set of distances. For example, the system may select a vector with the shortest distance to the vector of the stored value. In the example above, the vector 'pass' has a distance of '0' and so that vector may be selected.

At operation 550, the system may cause access to be granted to the computer resource based on a comparison of a value corresponding to the selected vector and a threshold. For example, a comparison of the distance value to a threshold. In other examples, the value may be a ratio of the distance value of the vector and a second vector (e.g., a second closest vector). The threshold may be predetermined or specified. In other examples, the threshold may be determined based on a length of the stored value. That is, for shorter stored values, the threshold may be set such that a closer match between the submitted symbols and the stored value is necessary to improve security. Thus, a stored value of three characters may have a lower threshold (where lower is a closer match) than a stored value of ten characters.

Figure 6:
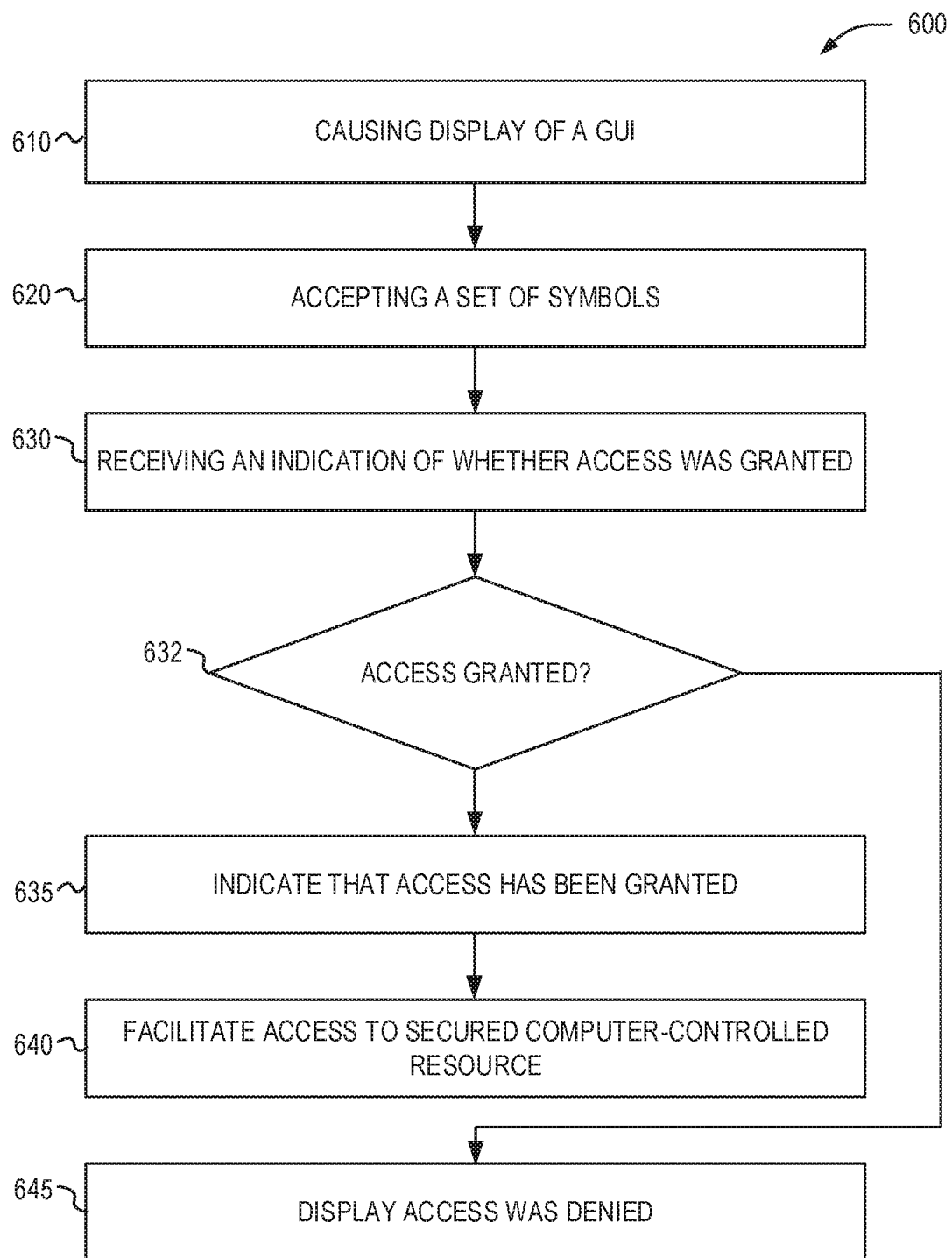
FIG. 6 illustrates a flowchart of a method of authenticating a user according to some examples of the present disclosure.

FIG. 6 illustrates a flowchart of a method 600 of authenticating a user according to some examples of the present disclosure. At operation 610, the client may cause display of a GUI. For example, a GUI shown in FIG. 7. The GUI may have one or more data entry fields for entry of one or more symbols of one or more credentials by the user. For example, the GUI may comprise an input field for accepting characters of the requested authentication credential from an input device. In some examples, the GUI accepts the requested authentication credential in the form of a set of symbols (e.g., characters), Example input devices may include keyboards, on-screen keyboards, mouse inputs, touch inputs, biometric inputs, and the like. In some examples, the GUI may require that the set of symbols (e.g., characters) to include more symbols (e.g., characters) than a stored credential. For example, by checking a length of the characters entered by the user and checking that length against a length of a stored password. In some examples, the GUI may require that the set of characters include a threshold number of symbols more than a stored credential. The threshold may be prespecified or may be determined based on the length of the credential. For example, if the credential (e.g., password) is short, the system may require more noise symbols than if the credential is long. In other examples, the system may compare the values of the submitted symbols entered to the value of the symbols of the credential to determine if noise symbols were added.

In some examples, the client may check to make sure that the noise symbols (e.g., characters) are interspersed with the submitted credential. For example, if the noise symbols are at the beginning, end, or both beginning and end, but not interspersed within the submitted symbols, then the client may display an error. For example, if a measurement of spread of positions of the noise symbols throughout the credential symbols is below a threshold, then the client may show an error and make the user fix the submitted symbols such that the measurement of spread is above or equal to the threshold. Measurement of spread is detailed in more depth below.

If any of the above checks indicate that the submitted symbols (e.g., characters) of the user do not meet one or more of the above requirements, the client may display an error and require the user to correct the submitted symbols. The error may be displayed once the user submits the symbols through an input specifying that entry of the symbols (e.g., characters) is complete (e.g., pressing ENTER, clicking or tapping a button indicating that entry is complete, or the like). In other examples, the system may monitor the symbols entered as the user inputs them. For example, after a predetermined number of symbols (e.g., the length of the stored credential), the system may check the symbols for length, noise symbols, and/or measurement of spread, depending on the implementation. Example warnings to the user are shown in FIGS. 8A-8C.

At operation 620, the client may accept the symbols (e.g., characters) entered by the user in the one or more data entry fields of the GUI. For example, after the user has submitted an input to indicate that the set of symbols is complete and the set of characters meets the requirements (e.g., the length is greater than the credentials; the submitted symbols include noise characters; the noise is interspersed; and/or the noise is interspersed and the spread measurement is above a threshold).

At operation 630, the client may receive or identify an indication of whether access was granted or not. In some examples, the client may send the submitted symbols to a remote authenticator in a remote computing device, such as shown in FIG. 2. The client may then receive the indication from the remote device of whether access was granted or not. In other examples, the client itself may include the authenticator and may perform the authentication as shown in FIG. 1. In these examples, the indication may be an indication of whether access was granted or not from the authenticator that is received through a function return, interprocess communication, or the like.

At operation 632, the system may determine whether the indication was that access was granted or denied. If access is denied, then at operation 645 the GUI may be caused to display a message that access was denied. In some examples, the user may retry the authentication. In some examples, a limit on the number of retry attempts may be implemented that prevents the user from retrying the authentication after a determined number of authentication failures within a determined amount of time.

If at operation 632, access is granted, then at operation 635 the system may indicate that access has been granted. For example, the system may cause the GUI to display an indication that access was granted. In other examples, the system may simply remove the login screen and reveal access to the access-controlled resource. In other examples, the system may provide the requested access-controlled resource. At operation 640, in some examples, the client may facilitate access to the requested secure access-controlled resource, such as by redirecting a user's browser to an address for the resource, executing a function that provides the resource, or the like.

FIG. 7 illustrates a diagram of an example GUI for allowing users to enter authentication credentials according to some examples of the present disclosure. In the example of FIG. 7, there are two credentials, a username and a password. A user may select one of the boxes next to the requested credential and type in the symbols of the requested credential. For example, the user may type in the symbols of the username and/or password. When the user is finished, the user may enter an input specifying that entry of the characters is complete (e.g., pressing ENTER, clicking or tapping the submit button indicating that entry is complete, or the like).

FIGS. 8A-8C illustrate diagrams of example GUIs for allowing users to enter their authentication credentials according to some examples of the present disclosure. In FIG. 8A, the user has begun typing the user's password and the client has recognized that the user has not yet added any noise characters. The client then prompts the user with a warning. The warning may be in response to the user typing a threshold number of characters that does not include a noise character. The warning may disappear once the user enters a first noise character in some examples. In other examples, the client may calculate a ratio between noise characters and legitimate password characters. The warning may be displayed while the ratio is below a specified threshold ratio. In some examples, a warning may be displayed when a measure of spread is not within a target measure of spread (e.g., not above or below a threshold, or not within a specified range). In other examples, the warning may be shown in response to the user selecting "submit", and may prohibit the user from continuing until corrected.

In FIG. 8B, the user has begun typing a password, and the client has recognized that the password exceeds or falls short of a fixed length. In this example, the fixed length is required for the user's entry. The fixed length may include a fixed total length for all characters entered, or a fixed length of noise characters. In an example, the password entry box may limit the user such that more characters than the fixed limit are prevented from being entered. In an example, the client may prompt the user with a warning regarding the fixed length issue. The warning may disappear once the user enters a number of characters equal to the fixed length in some examples. In other examples, the fixed length may be a minimum length such that the warning may disappear when the fixed length or more characters are entered. In other examples, the warning may be shown in response to the user selecting "submit", and may prohibit the user from continuing until corrected.

In FIG. 8C, the user has begun typing a password, and the client has recognized that the entered characters do not include a subset of a valid password. For example, the entered characters may include the entire password or may not include any subset of the password. In this example, a subset of the valid password is required for the user's entry (and optionally not the entire valid password). In an example, the client may prompt the user with a warning regarding the fixed length issue. In an example, a minimum length of the subset may be required, and the warning may be displayed when the entered characters do not include a subset of the valid password of a sufficient length (e.g., meeting or exceeding the minimum length). The warning may disappear once the user enters a subset of the valid password. In other examples, the warning may be shown in response to the user selecting "submit", and may prohibit the user from continuing until corrected.

Split Authenticator Functions for Distributed Computing

While the above-mentioned examples included an authenticator in either the user device or a remote device, in other examples, some functionality of the authenticator may be performed in the user device and other functionality may be performed in the remote device. For example, an authenticator in the user device may create the vectors and/or calculate the distance metrics and send the results to an authenticator on a remote device. In some examples, this may allow for distribution of the computational resources necessary for authenticating by having the client devices share some of the computational burden.

In some examples, the intermediate results may be protected in transit using encryption. In some examples, to prevent tampering, the results may be protected by a secured symmetric key given to a trusted application. The authenticator of the remote device may then use the corresponding key to unlock the results. By unlocking the results successfully, the authenticator on the remote device may trust that the results were produced by the trusted application. In some examples, to further prevent tampering, the authenticator on the user device may execute in one or more protected environments, such as a software guard extensions (SGX) environment or the like.

Figure 9:
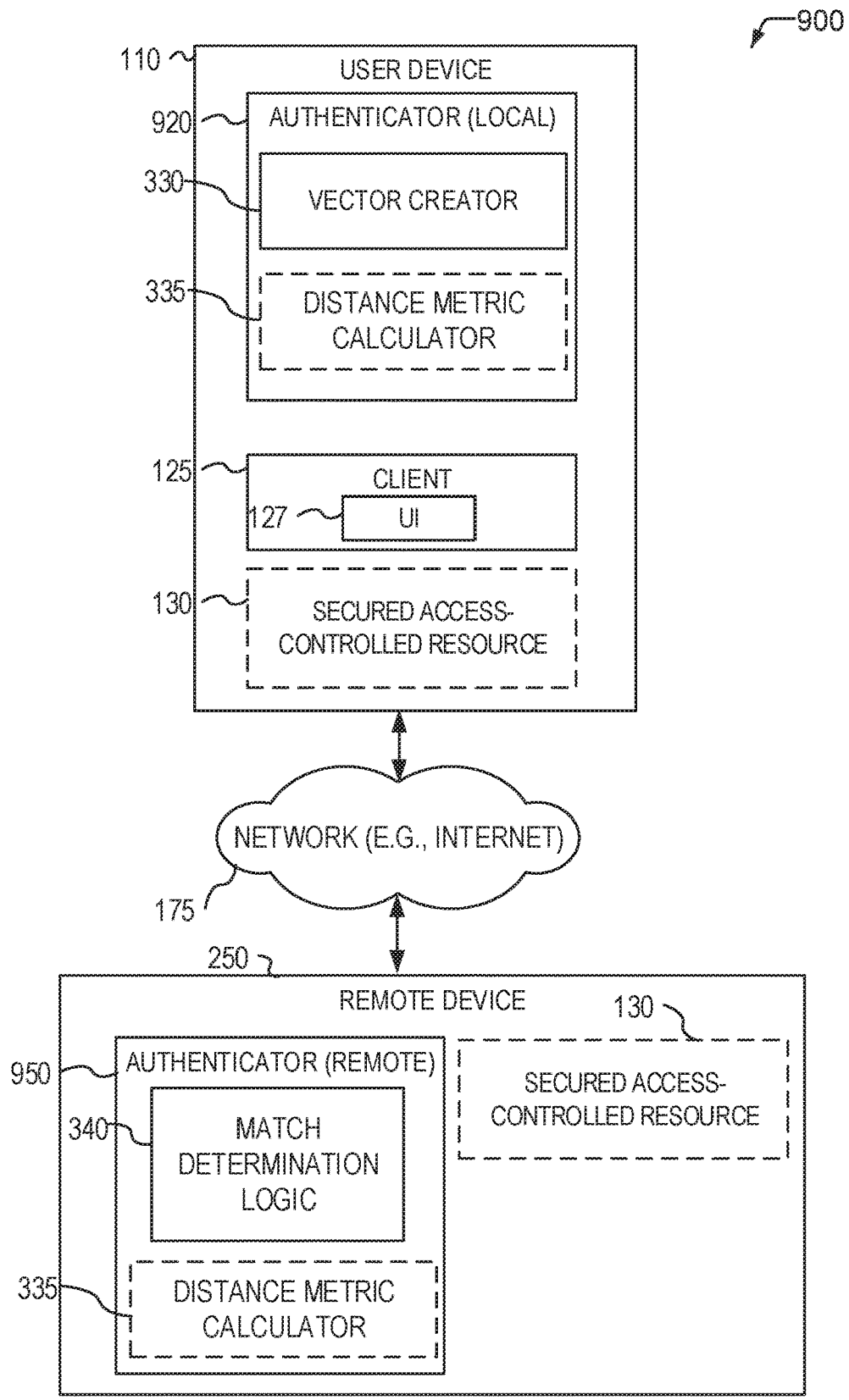
FIG. 9 illustrates a diagram of a user device and a remote device with distributed authentication functions according to some examples of the present disclosure.

FIG. 9 illustrates a diagram 900 of a user device 110 and a remote device 250 with distributed authentication functions according to some examples of the present disclosure. FIG. 9 illustrates a system whereby the user device 110 performs part of the authentication process and provides intermediate calculations or partial results to the remote device 250. For example, the user device 110 includes a local authenticator 920 which includes vector creator 330 and optionally distance metric calculator 335. In these examples, the submitted symbols (e.g., characters) are submitted to the vector creator 330 which creates the set of vectors (e.g., those shown in FIG. 3) and sends these to the remote device 250.

In some examples, the local authenticator 920 may include a distance metric calculator 335 which may calculate the distances between the credential password) and the vectors and send the distances to the remote device 250. The remote device 250 includes a remote authenticator 950 which may include a match determination logic 340 and/or a distance metric calculator 335 (depending on whether the user device includes the distance metric calculator 335). If the user device 110 provides the vectors to the remote device, the remote device 250 may provide those to the distance metric calculator 335 for calculation of the distance metrics. If the user device 110 provides the distance metrics (e.g., the user device 110 has the distance metric calculator 335), the remote device receives those and passes them to the match determination logic. The match determination logic 340 utilizes the distance metrics to make a determination as to whether access is granted as previously described. As is shown in FIG. 9, the secured access-controlled resource 130 may be on either the user device 110 or the remote device 250.

Length Cheeks on Submitted Symbols

While the above disclosed authentication system protects well against eavesdroppers, it may also be computationally expensive. In some examples, an attacker may attempt to cause a denial of service (DOS) attack against the authenticator by submitting symbols of a long length. For example, an attacker may submit an authentication attempt of 150 characters. If the password is only 10 characters, there are many in-order combinations of length ten of the submitted symbols. The large number of vectors generated may also trigger many distance measurements to be generated. These operations may utilize large amounts of processing and memory resources of the authenticator. A sophisticated attack may feature hundreds of such attack authentication attempts that may overwhelm the authenticator and prevent the authentication of legitimate users as the authenticator may be too busy servicing illegitimate attacks to attend to the legitimate authentication.

In some examples, to prevent this problem, the client and/or authenticator may reject authentication requests with submitted symbols (e.g., submitted characters) that do not meet length requirements. For example, submitted symbols with a length that is above a length threshold may be accepted. The length threshold may be measured against a total length of the submitted symbols (e.g., password characters and noise characters), a length of the noise symbols only, a length of the password symbols only, a ratio of noise symbols to password symbols or the like. In other examples, the length may be a specified length. That is, the submitted symbols, the noise symbols, and/or the credential symbols may be required to be of a specified length. The rejection may be handled prior to creating the vectors, such that a rejected authentication attempt is not processed to create the vectors.

The present disclosure solves a technical problem of providing secure access to computing resources using a secure password that is resistant to keyloggers, eavesdroppers, and man-in-the middle attacks as well as being resistant to denial of service attacks. The entered symbols are limited to the threshold to prevent overly complicated calculations at the authenticator.

Figure 10:
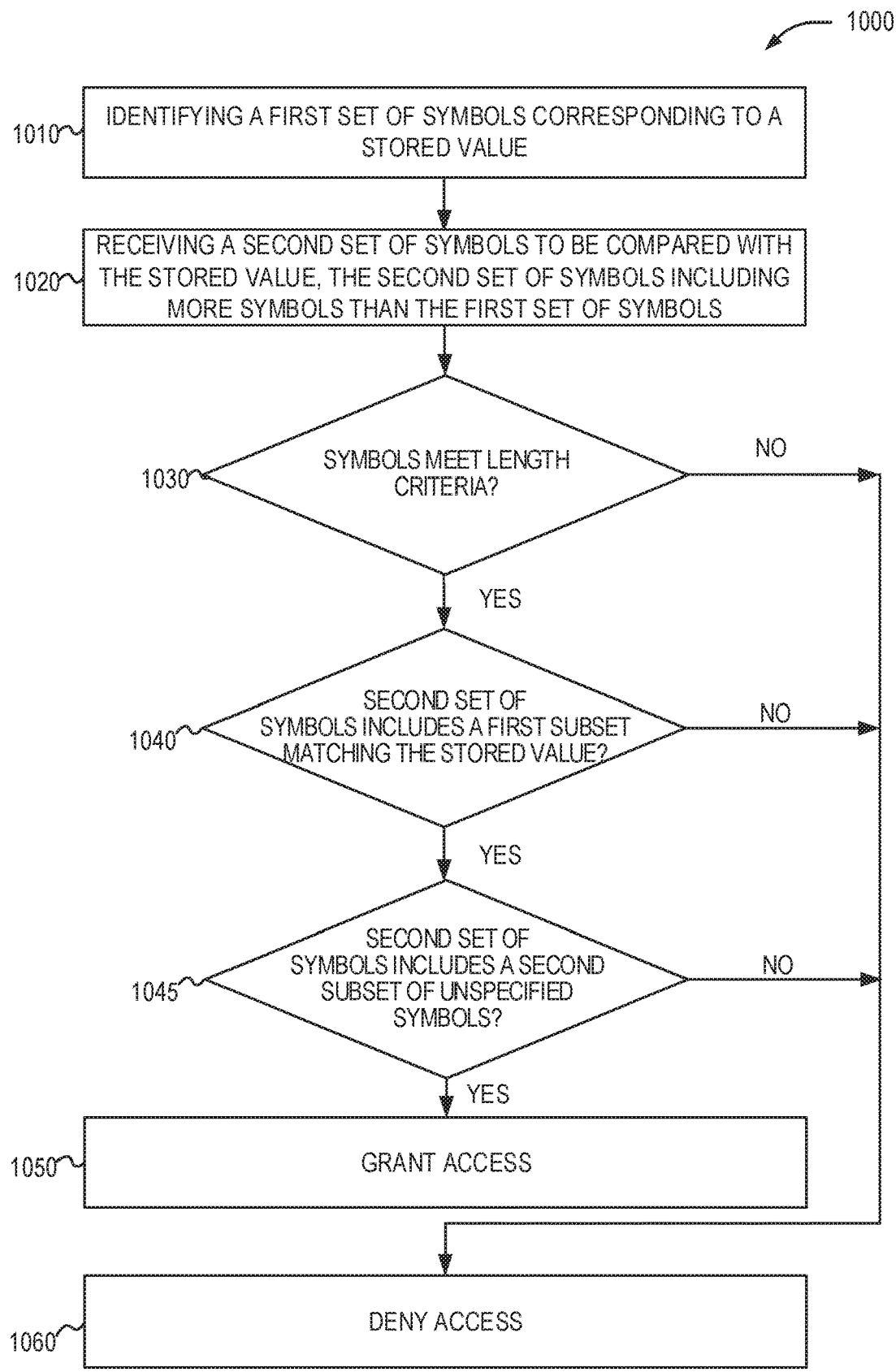
FIG. 10 illustrates a flowchart of a method of authenticating a user with a size limit according to some examples of the present disclosure.

FIG. 10 illustrates a flowchart of a method 1000 of authenticating a user with a size limit according to some examples of the present disclosure. At operation 1010 the authenticator identifies a first set of symbols corresponding to a stored value, such as a password, other credential, or other stored value. At operation 1020, the authenticator receives a second set of symbols to be compared with the stored value, the second set of symbols including more symbols than the first set of symbols. For example, the symbols may be entered password characters.

At operation 1030, the system may determine whether the symbols meet one or more length criteria. If the symbols meet the one or more length criteria, then processing continues to operation 1040, otherwise authentication is denied at operation 1060. Length criteria may be minimum lengths, maximum lengths, or ranges of minimum and maximum lengths.

In some examples, the symbols checked against the criteria at operation 1030 are the submitted symbols (e.g., the characters entered by the user including both the credential characters and the noise characters) and the criteria is that the number of submitted symbols are less than a threshold e.g., operation 1030 is determining if the total length of the submitted symbols is less than a threshold length. Thus, if a user enters 30 characters and the threshold is 25, the authentication would fail the determination at operation 1030 and access would be denied at operation 1060. In some examples, there may be a required minimum total length m addition to a maximum length (e.g., to ensure that enough noise symbols are entered).

In another example, the symbols checked against the criteria at operation 1030 are the noise symbols and the criteria includes a restriction that the number of noise symbols are less than a threshold. That is, operation 1030 is determining if the number of noise symbols is less than the threshold number of noise symbols. This may be accomplished by subtracting a total number of symbols in the submitted symbols from a length of the credential and comparing the result to the threshold. For example, if the submitted symbols are 12 symbols long and the stored credential is 5 symbols long, then (12−5)=7 is compared with the threshold. If the threshold is 8 or more, then processing may continue, otherwise, the access is denied at operation 1060. In other examples, a number of noise symbols may be determined by removing the symbols corresponding to the credential from the submitted symbols and then comparing a count of the remaining symbols to the threshold. For example, when the credential is a password and the valid password is "pass" and the submitted symbols are characters entered by the user and are "pass12345" the characters 'p', 'a', 's', 's' are removed leaving "12345", which is five characters long. Five is then compared with the threshold. If five fails to meet or exceed the threshold, then at operation 1060 access may be denied. As noted above, in some examples a minimum number of noise symbols may also be required such that both a minimum and a maximum number of noise symbols may be required.

In other examples, rather than a threshold length, the length criteria is an exact symbol count (e.g., the amount of symbols is no more and no less than the specified symbols). For example, the submitted symbols may be required to be of a preset count. In other examples, the noise symbols may be required to be of a preset count. In yet other examples, a ratio of noise symbols to credential symbols may be required to be of a preset ratio. For example, when the submitted symbols are required to be ten symbols, and the credential is "pass" then the system may require four credential symbols (e.g., characters) and six symbols to be added as noise symbols (e.g., characters) as the total (noise and credential symbols) must equal ten symbols. For example, if the total count of the submitted symbols is not equal to the preset count, access may be denied. In some examples, the preset count may be global for all authentication attempts or may be specified for each authentication attempt.

At operation 1040 the authenticator determines if the second set of symbols includes a first subset of symbols matching the stored value. If the second set of symbols does not include a first subset of symbols matching the stored value, then access is denied at operation 1060. If the second set of symbols includes a first subset of symbols matching the stored value, then processing continues at operation 1045. For example, the authenticator searches for the stored credential in the second set of symbols. As previously explained this may include splitting the submitted symbols into vectors and calculating distances between each vector and the stored credential. The distances may be used to determine whether the second set of symbols includes a first subset matching the stored value (e.g., the stored credential).

At operation 1045, the authenticator may determine whether the second set of symbols includes a second subset of unspecified symbols. That is, the authenticator ensures that noise symbols have been added to the submitted symbols. In some examples, this operation may have already been performed as the results of the symbols meeting the length criteria at operation 1030 may ensure a minimum number of noise symbols. If noise symbols have been added, then at operation 1050, access may be granted. If noise symbols have not been added, then at operation 1060, access may not be granted. As described herein, the authenticator may also require that the noise symbols meet a criteria related to a measure of spread, that there be a minimum number of noise symbols, and/or the like.

It is noted that the authenticator does not specify for any authentication attempt where the noise characters are to be placed, and what the noise characters are. This protects the user by preventing eavesdropping of these locations. By requiring a maximum amount of submitted symbols, external attacks on the authenticator that may deny service may be avoided.

Insertions Required

As noted previously, in some examples the system may force the user to enter noise symbols within the entered symbols of the credential. This may prevent the user from simply typing their normal credentials without the additional protections the noise symbols offer against eavesdroppers. The addition of noise symbols (such as noise characters) may be enforced at the authenticator or the client. For example, at the client, the client may have a local copy of the user's credential and may compare the submitted symbols to the credential to determine whether the submitted symbols include noise symbols that are interleaved with the credential symbols. The authenticator may reject authentication attempts where the submitted symbols do not include the noise symbols.

In examples in which the client checks for the insertion of noise symbols, determining whether the entered symbols include noise characters may include determining that a minimum number of symbols were entered (e.g., a sum of the password length and a threshold number of noise characters). In some examples, only a single noise symbol may be required to be entered, but in other examples a threshold amount of noise symbols may be required to be entered. In some examples, the system may combine a length cap on submitted symbols with a forced character insertion such that the user must input a number of symbols that falls within a minimum and a maximum number of symbols.

In some examples, to prevent users from simply repeating symbols of the credential (which may not be as secure as random symbols), the system may compare the credential to the submitted symbols. For example, the system may require that the noise symbols be symbols that are not present in the credential symbols. Thus, if the credential is a password with characters "pass" then the noise characters must be characters other than 'p' 'a' 's' 's'. If the noise symbols include symbols from the credential, authentication may be denied. In some other examples, rather than making a direct comparison, some repeated characters from the credential may be allowed, however a difference metric may be calculated by the client that quantifies how different the stored credential is from the submitted symbols. A minimum difference value may be required for authentication to be successful. The client may enforce these standards by refusing to pass the submitted symbols to the authenticator if they do not meet these standards.

In examples in which the authenticator enforces the insertion of noise symbols, determining whether the submitted symbols include noise symbols may be done similarly to that described for the client, such as determining that a minimum number of symbols were entered (e.g., a sum of the password length and a threshold number of noise characters). In other examples, the authenticator may utilize the distance metric to quickly determine whether noise symbols were inserted. For example, the authenticator may require that at least one distance metric be above a threshold difference (e.g., not a perfect match). In other examples, the distance metric may be used to quickly determine whether a user has previously used the exact same submitted symbols. For example, the system may compare one or more distance metrics to one or more past distance metrics of vectors created from past authentication attempts. If there is an exact match for a previous distance metric from a previous authentication attempt, the system may reject the authentication request, Enforced Symbol Distribution Users may not always comply with the goals of the present system—either intentionally or inadvertently by choosing locations for noise symbols that are predictable and not random. For example, users may add noise symbols at the front, back, or both the front and the back rather than randomly interspersed amongst the credential (e.g., password). In so doing, they may not achieve the level of protection offered by the disclosed authentication scheme as they may attempt to simply enter the noise before, after, and/or before and after the legitimate credential. If the user's introduction of noise symbols in the credential is not well-distributed, an eavesdropper may still discern a user's credential through observing patterns of symbols across multiple authentication attempts.

As an example, consider the following sequences of authentication attempts where the user's credential is "pass":
1. "1234pass567"
2. "p343423ass"
3: "passxyzabc"

In these examples, it may be possible for an eavesdropper (even a shoulder-surfer) to observe multiple log-in attempts and discern a user's credential as the common characters between each authentication attempt may be quickly separated from the noise symbols by observation. To prevent this, the system may determine one or more metrics for determining how well distributed the noise symbols are within the credential (or equivalently, how well distributed the credential is within the noise symbols). In some examples, a metric, termed a measure of spread may quantify how evenly one set of symbols is distributed within a second set of symbols.

The system (either the client or the authenticator) may require that the measure of spread of the positions of noise symbols in credential symbols be above a specified threshold to ensure that the noise symbols are distributed throughout the credential. In some examples, the system (either the client or the authenticator) may specify that the measure of spread also be below a specified threshold to ensure that perfect distributions of noise symbols throughout the credential are also avoided, as a perfect distribution may also be easy for an eavesdropper to figure out. The system may desire to obtain what appears to be a random distribution of noise symbols in credential symbols by requiring a measure of spread to be within a particular range.

In some examples, the system may also store a history of a calculated measure of spread for past authentication attempts for a specified number of logins or time frame. The system may require the measure of spread to be varied over time, such that authentication attempts with submitted symbols that are either a same measure of spread, or are similar (e.g., within a threshold number) to each other may be rejected. This may assist in promoting randomness in distributing the noise symbols. In some examples, the system may statistically analyze a user's measurements of spreads for past authentication attempts. Example statistical analysis include calculations of a standard deviation of the measurements of spread. If the standard deviation is lower than a threshold, the system may adjust the target range of the measurement of spread to move the standard deviation toward the threshold. In this way, the system monitors the distribution of noise symbols in the password symbols over time to better achieve a random appearance.

In some examples, when users are entering in their credentials, the system may calculate, in real time, a measure of spread and provide an indication of whether the user is within the desired range. This may be a simple indication that the user is within the acceptable range, or that the user is not within the acceptable range. If the user is not within the acceptable range, the system may provide tips on moving to the acceptable range u "insert more noise characters" or "remove some noise characters").

The present disclosure thus solves a technical problem of providing secure access to access-controlled resources using a secure credential that is resistant to keyloggers, eavesdroppers, and man-in-the middle attacks. By enforcing good noise symbol distribution, the system may ensure that users take advantage of the security enhancing aspects of the present disclosure by ensuring that the credentials are not easily deciphered from the submitted symbols. For example, the present system may ensure that the noise symbols appear random, rather than following a discernable pattern.

Figure 11:
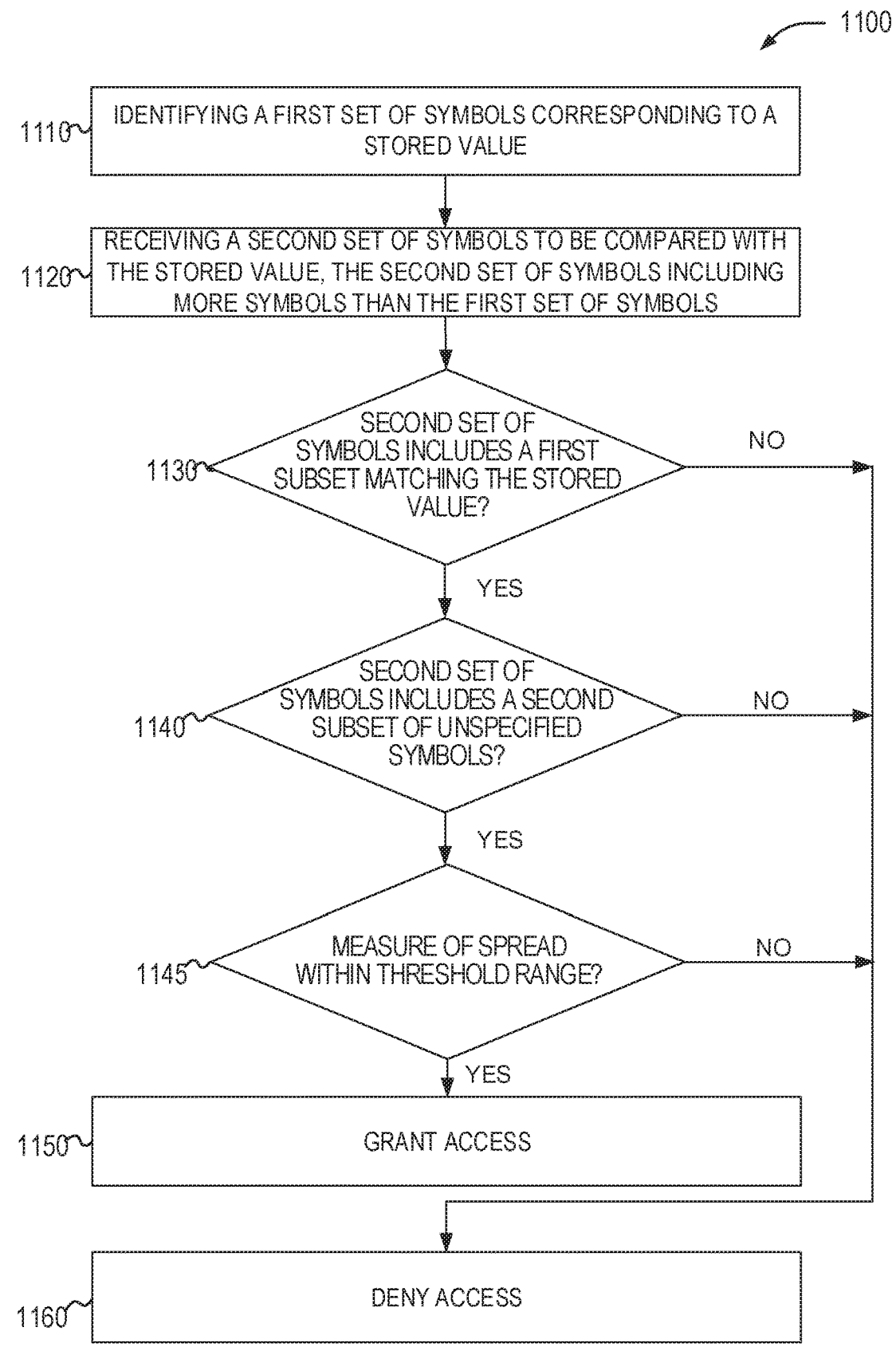
FIG. 11 illustrates a flowchart of a method of authenticating a user with a measure of spread criteria according to some examples of the present disclosure.

FIG. 11 illustrates a flowchart of a method 1100 of authenticating a user with a measure of spread criteria according to some examples of the present disclosure. At operation 1110 the authenticator identifies a first set of symbols corresponding to a stored value, such as a password. At operation 1120, the authenticator receives a second set of symbols to be compared with the stored value, the second set of symbols includes more symbols than the first set of symbols. For example, the symbols may be entered password characters.

At operation 1130 the authenticator determines if the second set of symbols includes a first subset of symbols matching the stored value. For example, the authenticator determines if the second set of characters includes the stored credential (e.g., password). If the second set of characters does not include the stored credential, then at operation 1160, access may be denied. If the second set of characters includes the stored credential, then processing moves to operation 1140. In some examples, to determine whether the second set of characters includes the stored credential the second set of symbols may be decomposed into a set of size m in-order vector combinations of the second set of character, where m is a number of symbols in the stored credential. The vectors reflect each of the possible in-order length m combinations of the submitted symbols. A distance metric may be calculated for each of the vectors that measures a distance between the stored credential and each vector. The decision of whether the second set of characters includes the stored credential may be based on the distance metrics and whether at least one of the distance metrics is within a threshold distance of the stored credential.

At operation 1140, the authenticator determines whether the second set of symbols includes a second subset of unspecified symbols in one or more unspecified positions within the second set of symbols. For example, the authenticator determines whether noise characters are added to the password characters. In some examples, the authenticator may ensure that additional characters are entered to ensure that the user is secured from eavesdropping attacks. If there are no additional noise characters added, then at operation 1160 access is denied. Otherwise, processing may continue at operation 1145. It is noted that the authenticator does not specify for any authentication attempt where the noise characters are to be placed, and what the noise characters are. This protects the user by preventing eavesdropping of these locations.

At operation 1145 the system may determine whether a measure of spread of respective positions of the first subset or the second subset within the second set of symbols is within a threshold range or otherwise meets one or more specified criteria. Thus, the system may (depending on the design) determine how distributed the first subset is within the second set of symbols (e.g., how distributed the password characters are), or, how distributed the noise symbols are within the second set of symbols.

Example measurements of spread include calculating a greatest distance between respective positions of subsequent ones of the first or second subset of symbols within the second set of symbols. For example, if the password is "pass" and the user enters 'p1a2s3s4', the measurement of spread would be 1. In these examples, the system may require a minimum measure of spread—e.g., that the greatest distance between respective positions of subsequent ones of the second subset of symbols within the second set of symbols be less than a threshold. In other examples, the measurement of spread may be an average distance between respective positions of subsequent ones of the first or second subset of symbols within the second set of symbols.

In yet other examples, the measurement of spread may be a variance of the respective positions of the first or second subsets of symbols within the second set of symbols. In still other examples, the measurement of spread may be a standard deviation of the respective positions of the first or second subsets of symbols within the second set of symbols.

In some examples, the threshold range may be an upper threshold, a lower threshold, or an upper and a lower threshold. The thresholds may be specified, or may be derived. For example, the thresholds may be derived from a length of the credential. For example, a higher level of spread may be required for shorter credentials (to increase security) than longer credentials, or vice versa. In some examples, both an upper bound and a lower bound ensures that the noise symbols are noisy that is, they do not conform to an easy to decipher pattern. For example, a case where a user's password is "pass" and the user enters "p1a2s3s4" may be less secure than a user entering "p12as22s" because the every-other-symbol insertion of noise symbols in the former may be more predictable than the more random insertion in the latter. By requiring the spread to be higher than a minimum, but not a perfect spread, the system may require more randomness.

If at operation 1145, the measure of spread is not within the threshold range, then access may be denied at operation 1160. If at operation 1145, the measure of spread is within the threshold range, then at operation 1150, access may be granted.

In an example, spread of noise in a password within a set of entered characters may be determined by creating a set of vectors of the entered characters. The set of vectors may be generated as described herein. A distance metric from one or more of the set of vectors to vectors of the password may be compared. In an example, an average, a median, or a total vector distance may be evaluated and compared to a threshold. When the average, median, or total distance transgresses the threshold, the set of entered characters may be determined to have sufficient spread. In another example, a subset of the set of vectors may be used (e.g., only vectors that are between two thresholds, a "close" threshold and a "far" threshold may be used), and the subset may be required to have a minimum number of vectors.

In yet another example, the subset of vectors may be generated by taking sequential, in-order characters of a total length equal to the password. For example, the password may be "pass," and the entered characters "g #rss," which is an example with noise sufficiently spread throughout. The set of vectors may be constructed in this example to be "p #ar", "#ars", and "arss." None of these are particularly close, distance-wise to "pass". An example of entered characters having insufficient spread would be "#rpass." In this example, the set of vectors may include "#rpa", "rpas", and "pass." These vectors are closer in distance to the password (including the password itself), thus the entered characters may be determined to have insufficient spread.

Figure 12:
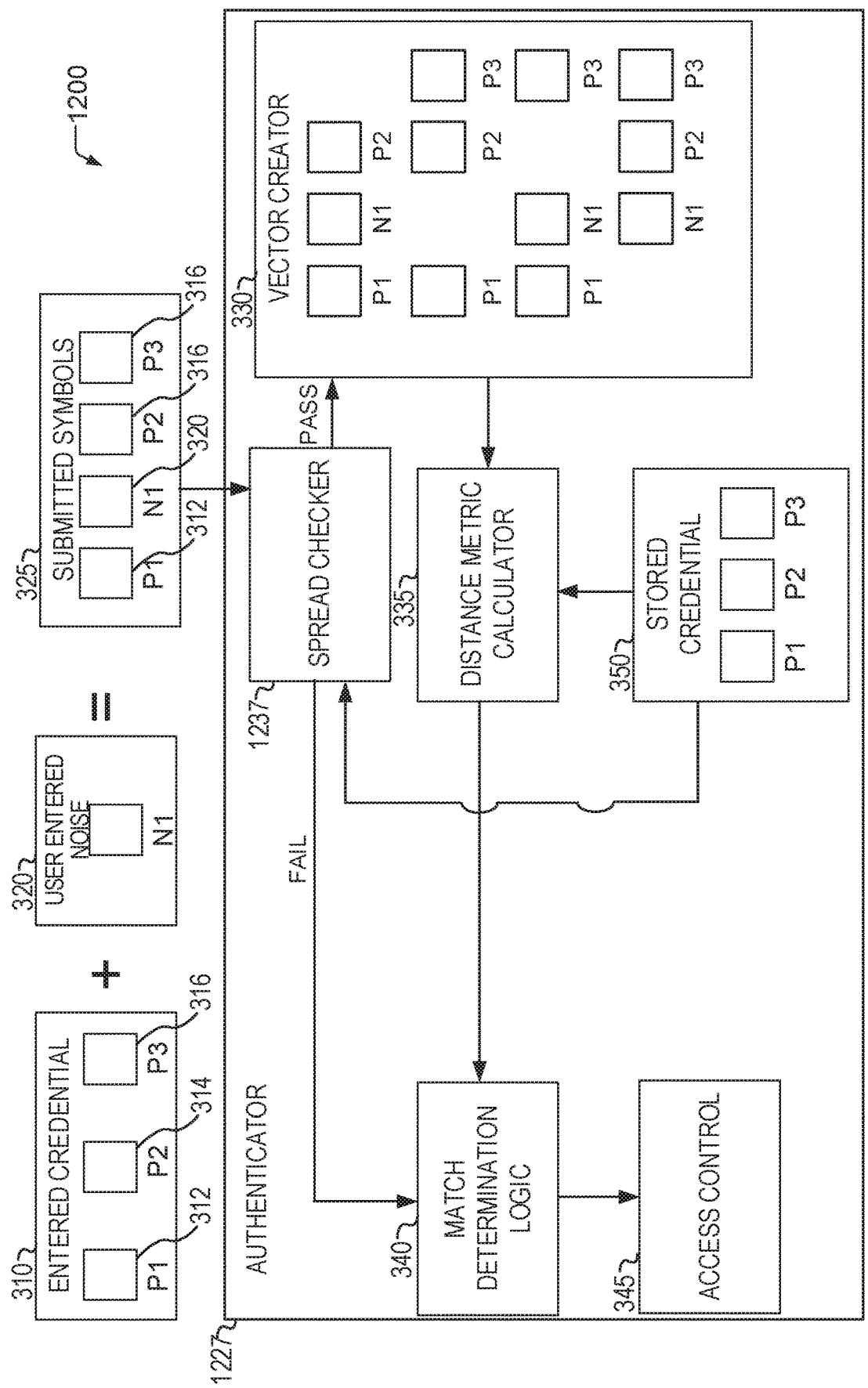
FIG. 12 illustrates a diagram of a data flow of an authentication with additional, unspecified noise symbols according to some examples of the present disclosure.

FIG. 12 illustrates a diagram of a data flow 1200 of an authentication with additional, unspecified noise symbols according to some examples of the present disclosure, FIG. 12 is similar to FIG. 3, except in FIG. 12, the authenticator 1227 includes a spread checker 1237. Spread checker 1237 may calculate a measure of spread that quantifies how well distributed the user entered noise symbols 320 are within the submitted symbols 325 (or how well distributed the credential symbols are within the submitted symbols 325). Spread checker 1237 may be included in authenticator 327, either in a user device 110, or a remote device 135 as shown in FIGS. 1, and 2. Spread checker 1237 may also be part of the client 125. For example, the measure of spread may be calculated as the user enters the credential and may give feedback to the user in real time indicating whether the measure of spread is within an acceptable range.

Spread checker 1237 may calculate a spread of either the noise symbols 320 (e.g., characters) within the total submitted symbols 325 entered by the user or the credential symbols 312, 314, and 316 within the total submitted symbols 325 entered by the user. As noted previously, example measurements of spread include calculating a greatest or average distance between password or noise characters, a variance, a standard deviation, or the like.

Spread checker 1237 may compare the calculated spread to determine whether the measure of spread meets a specified criteria. For example, the criteria may be whether the measure of spread is above a first threshold. In other examples, the criteria may be whether the measure of spread is below a second threshold. In yet other examples, the criteria may be whether the measure of spread is both above a first threshold and below a second threshold (and thus in a desired range). If the result is that the measure of spread of the submitted symbols 325 meets the criteria, then processing continues to vector creation with vector creator 330. If the measure of spread does not meet the criteria, then the determination may be made by match determination logic 340 that authentication is denied.

Duplicate Entry Prevention

In some examples, an eavesdropper may not try and decipher the password from the noise characters. Instead, the eavesdropper may utilize a replay attack whereby the entire entered sequence is captured and later "replayed" in its entirety, including the noise characters. To prevent this, in some examples, the system may take measures to detect and reject authentication attempts that are identical or similar to past authentication attempts.

For example, the authenticator may store the submitted symbols for a plurality of past authentication attempts. When a new authentication attempt is made, the newly received submitted symbols are compared to stored submitted symbols for past authentication attempts. If the newly received submitted symbols for the current authentication attempt match, or are within a specified threshold level of similarity of (to prevent simple changes), one of the stored past submitted symbols for past authentication attempts, the system may reject the authentication attempt.

The system may store the submitted symbols for the plurality of past authentication attempts for a specified time period (e.g., the last day, last week, last month, and the like), a specified number of authentication attempts, or the like.

In other examples, instead of storing past submitted symbols, the system may store one or more of the distance metrics or measurements of spread of past authentication attempts. For example, the system may store the two or three closest distance metrics for each authentication attempt. If one or more distance metrics and/or spread measurements of a current authentication attempt are within a threshold difference of one or more distance metrics and/or spread measurements of past authentication attempts, then the present authentication attempt may be rejected. By storing the distance metrics or spread measurements instead of the submitted symbols, the system may reduce the amount of storage needed to prevent replay attacks.

Partial Password Subset

In some examples, an eavesdropper may have access to the user's communications over multiple authentication attempts. For example, keyloggers and man-in-the middle attacks may observe the user over many authentication attempts. An attacker may be able to discern a user's password by detecting common characters across multiple authentication attempts. Even if the system enforces a random-like distribution of noise symbols in the credential, sophisticated algorithms may find patterns in the captured data.

To prevent this, the system may force the user to enter a subset of their credential. For example, the user's password may be "password" and the user may authenticate with "pass," "sswor," "word," or the like. In some systems, with the user's password as "password" other combinations such as "pawo" or "psrd" may be used (e.g., in a same order as characters in "password", but not necessarily sequential). In some examples, the system may require the user to use a different credential subset each authentication attempt. This makes it more difficult for eavesdroppers to observe the user's credential by detecting common symbols (e.g., characters) across multiple authentication attempts. In an example, the different credential subset may be repeated after a number of non-uses or a period of time (e.g., after 20 different subsets, a first entered subset may be repeated or after six months an already entered subset may be repeated).

The system may enforce a minimum subset length (e.g., the subset meets a minimum number of characters, a minimum percentage of the total password, or the like). The system may enforce a rule that a same subset may only be used a specified number of times over a specified number of authentication attempts (or a specified time period). For example, a same credential subset may only be used twice over ten authentication attempts. In some examples, the subset may be required to be comprised of contiguous symbols, but in other examples, skipping of symbols may be allowed. In some examples, the subset must be in order. That is, if the user's password is "password," the subset "pssord" is a valid subset, but "dpssor" is not.

The present disclosure thus solves a technical problem of providing secure access to access-controlled resources using a secure credential that is resistant to keyloggers, eavesdroppers, man-in-the middle, and replay attacks. This is accomplished through the introduction of user-specified random noise symbols that are introduced at user-specified random locations. The authenticating device decomposes the submitted symbols into a plurality of vectors and utilizes a distance metric to determine if authentication should be granted. By utilizing credential subsets in addition to noise symbols, the system may make it more difficult for attackers that are eavesdropping on the user to ascertain the user's credential.

Figure 13:
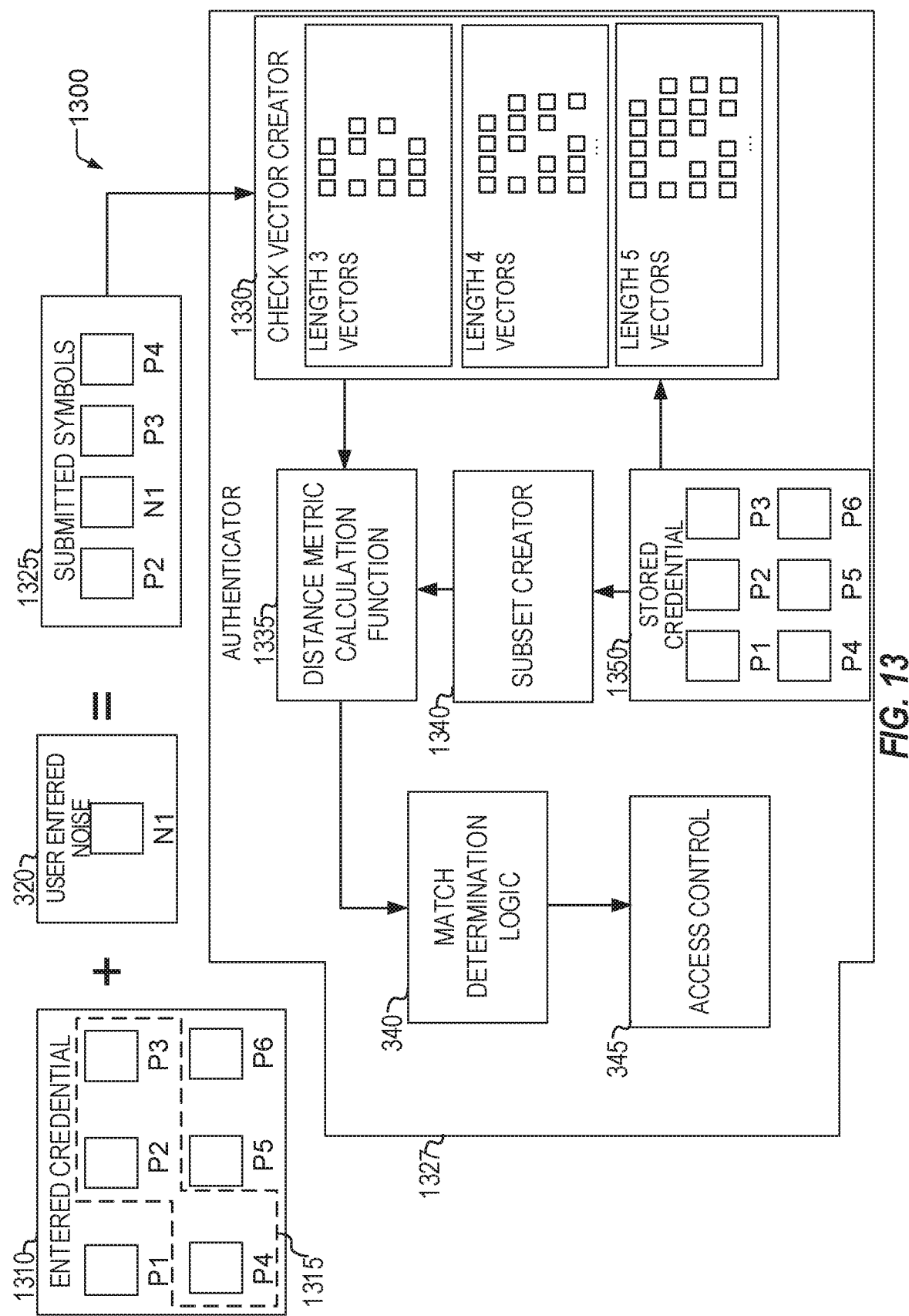
FIG. 13 illustrates a diagram of a data flow of an authentication attempt with additional, unspecified noise symbols and enforced credential subsets according to some examples of the present disclosure.

FIG. 13 illustrates a diagram of a data flow 1300 of an authentication attempt with additional, unspecified noise symbols and enforced credential subsets according to some examples of the present disclosure. The credential 1310 (e.g., password) may comprise six symbols in the form of characters P1-P6. In the example of FIG. 13, the user has entered P2, P3, and P4 as subset credential symbols 1315. The user, when entering the credential adds one or more noise symbols 320 (e.g., characters) to the subset. In the example shown in FIG. 13, for ease of description, only one noise symbol 320 is added. The submitted symbols 1325 entered by the user, includes the subset credential symbols 1315 along with the one or more noise symbols 320 interspersed into the credential characters.

The authenticator 1327 includes a subset creator 1340 that identifies a plurality of ordered vectors (called credential subset vectors) comprising ordered subsets of the stored credential 1350 of the user. In examples in which subsets must be of a minimum number of symbols, the subset creator 1340 creates credential subset vectors of the minimum size and greater (up to either the size of the stored credential 1350 or a maximum subset size). For example, if the minimum size is 5 characters, then each of the credential subset vectors is five or more characters and the credential subset vectors comprise a set of all possible subsets of the stored credential 1350 of five or more characters (optionally as a strict subset, e.g., not including the credential 1350 in its entirety).

Check vector creator 1330 receives the submitted symbols 1325 entered by the user and creates a plurality of vectors from the submitted symbols 1325, each having a length corresponding to a length of a credential subset vector created by the subset creator 1340. These vectors may be called "check vectors." The plurality of check vectors reflect each of the possible length m in-order, combinations of the submitted symbols 1325, where in are valid subset lengths of the stored credential. The order of the symbols in each of the check vectors is a same order as an order of the credential symbols in the submitted symbols 1325. As shown in FIG. 13, in are vectors of length three, four, and five vectors. In other examples, in may be different lengths. For example, a user may submit a credential length with the submitted symbols 1325 (e.g., P2, N1, P3, P4 plus "4"). In another example, a user interface may indicate a credential length to be submitted (e.g., a random number greater than some minimum but less than the total credential length, or a number assigned by a credentialing service, such as the access control 345).

Each check vector and each credential subset vector is then passed to a distance metric calculator 1335 that calculates a distance between each combination of the credential subset vectors and each of the plurality of check vectors. In other examples, distance metric calculator 1335 calculates a distance between each same-sized combination of the credential subset vectors and each of the plurality of check vectors. In some examples, the distance metric may be a Levenshtein distance. In other examples, a distance metric may compare each symbol of each check vector to the corresponding symbol of each credential subset vector. If the symbols match, then the score may not be incremented. If the symbols do not match, the score may be incremented. In other examples, a higher score reflects a better match and thus symbols that match may cause the score to be incremented and symbols that do not match may cause no change in the score or may cause the score to be decremented. In still other examples, the distance metric may be a correlation, such as a Pearson correlation coefficient.

The distance metrics are then passed to the match determination logic 340. In some examples, the match determination logic 340 identifies the distance metric that signifies a closest match between a check vector and one of the credential subset vectors (e.g., a smallest distance). This may be a highest score (in the case of assigning points for a match), or may be a lowest score, depending on the implementation desired. If the distance metric that signifies the closest match is closer to one of the credential subset vectors than a threshold value (e.g., the distance is smaller than a threshold), then the match determination logic 340 may return that a match is found. In other examples, the match determination logic identifies two distance metrics that signify the two closest matches with the credential subset vectors (e.g., a smallest distance and a second smallest distance). The match determination logic 340 may then take the ratio of the two distance metrics and compare that to a threshold to determine whether there is a match.

Access control 345 may then grant or deny access to the secured access-controlled resource based on the result from match determination logic 340. For example, access control 345 may send a message to the computer device hosting the secured access-controlled resource to provide the results of the authentication attempt. In some examples, access control 345 may send a token to the user device or to the device hosting the secured access-controlled resource. In other examples, the access control 345 may provide the secured access-controlled resource. In some examples, the access control may send a signal to a physical device, which may provide access to a physical resource (e.g., unlock a door).

In some examples, the check vector creator 1330 may verify that the submitted symbols 1325 includes a subset, but not all the stored credential 1350. For example, the check vector creator 1330 may determine a count of the number of the symbols in the submitted symbols that match, in order, symbols from the credential. In some examples, the check vector creator 1330 may ensure this is within an acceptable range. For example, the check vector creator 1330 may compare this number of symbols to a minimum threshold (to ensure a minimum subset size) and a maximum threshold (to ensure that the subset is not too close to the entire password). If the number of symbols is within this range, the check vector creator 1330 may determine that authentication proceeds. If the number of symbols is not within the range, the check vector creator 1330 may cause authentication to be denied.

In some examples, the presence of a subset (and not the entire credential) may be determined by verifying that the check vector with the closest distance metric to any of the credential subset vectors is within a desired distance range. The range may enforce a minimum closeness and a maximum closeness. This ensures that the subset is complete enough to constitute an authentication, but not the entire (or almost entire) credential.

In yet another example, a ratio of the distance of the vector with a closest distance and the distance of the vector with a next closest distance may be compared to a minimum threshold. In this example, the system may also enforce a maximum threshold on the distance of the vector with the closest distance. In this example, a hybrid of thresholds is used to enforce the minimum and maximum, with the minimum threshold used on the ratio and the maximum threshold used on the distance itself.

The check vector creator 1330 may verify that the subset meets a minimum length. For example, the minimum length may be a specified length, or may be calculated based on the length of the stored credential 1350. For example, the shorter the credential length, the shorter the minimum subset length may be. In some examples, the minimum subset length may increase as the credential length increases until a defined maximum, at which point longer credential lengths do not increase the minimum subset length.

In some examples, the check vector creator 1330 may enforce duplicate entry restrictions such that that credential subsets that are entered are compared across authentication attempts to determine if the user is utilizing a same subset frequently (e.g., over a threshold occurrence). If the user's use of a particular subset transgresses a threshold rate of occurrence, the authenticator 1327 may reject the authentication attempt. In some examples, the rate of occurrence may be defined as a number of usages over a specified amount of time (e.g., the past day, week, month) or as a specified number of login attempts.

In some examples, the threshold frequency may be based on a length of the stored credential 1350. For example, depending on the length of the stored credential 1350, there may only be x number of valid subsets of a minimum length 1. In some examples, the threshold frequency may be set based on x, such as x divided by 2, or x, or x—a configurable or specified margin.

In some examples, in addition to enforcing a requirement of a different subset, the check vector creator 1330 may enforce a requirement that the noise symbols 320 may be different or be interspersed in different locations of the entered credentials 1310 across multiple authentication attempts.

Figure 14:
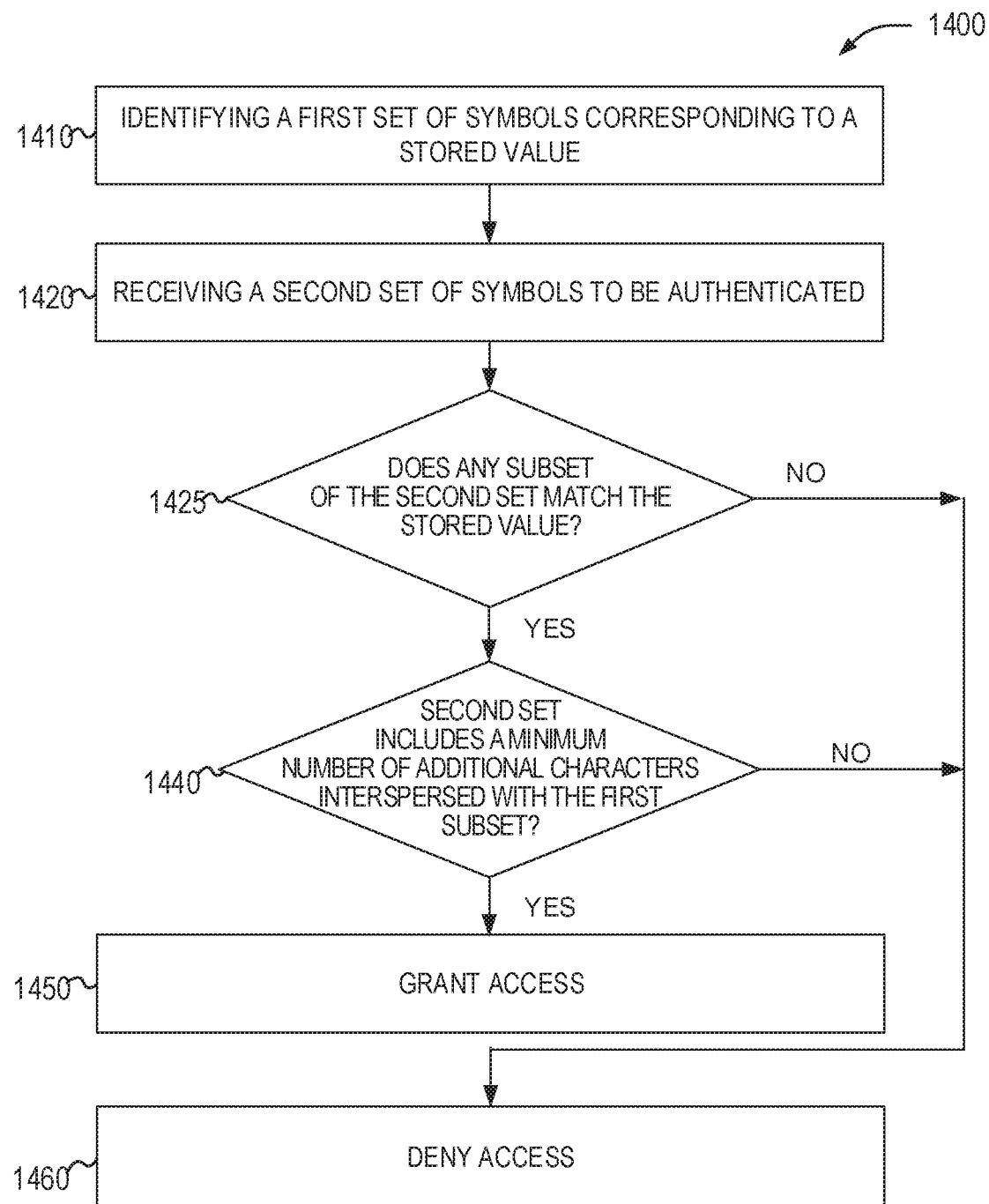
FIG. 14-16 illustrate flowcharts of methods of authenticating a user with a credential subset according to some examples of the present disclosure.

FIG. 14 illustrates a flowchart of a method 1400 of authenticating a user with a credential subset according to some examples of the present disclosure. At operation 1410 the authenticator identifies a first set of symbols corresponding to a stored value, such as a credential. At operation 1420, the authenticator receives a second set of symbols to be compared with the stored value, the second set of symbols includes more symbols than the first set of symbols. For example, the symbols may be entered password characters.

At operation 1425, the authenticator may determine if any subset of the second set of symbols matches the symbols of the stored value. For example, the authenticator may determine a plurality of ordered vectors (called credential subset vectors) comprising ordered subsets of the stored credential of the user of all possible lengths greater than a minimum subset length. For example, if the stored credential is "password" and the minimum subset length is three (in some examples, skipping symbols is not allowed, but other examples may allow for skipping, such as "pwd" in this example) the credential subset vectors would be all possible in-order subsets of three, four, five, six, seven, and eight characters. In some examples, a maximum subset size may also be specified. In these examples, the credential subset vectors may be limited to a maximum size to enforce the requirement that the credential entered be a subset and not the entire credential). The maximum size may be specified (e.g., by an administrator) or may be calculated based on the size of the credential. In the above example where the credential is "password," if the maximum subset size limit is six, then the credential subset vectors would be all possible in-order subsets of three, four, five, and six symbols (examples below shown where skipping is prevented for ease of readability):

3: pas;ass;ssw;swo;wor;ord;
4: pass;assw;sswo;swor;word;
5: passw;asswo;sswor;sword;
6: passwo;asswor;ssword;

The authenticator then creates a plurality of vectors (check vectors) from the second set of symbols, each vector having a length corresponding to a length of a corresponding credential subset vector. The check vectors reflect each of the possible in-order, combinations of the second set of symbols of a length corresponding to the length of a corresponding credential subset vector. For example, if there are four sets of credential subset vectors, with respective lengths of 3, 4, 5, and 6 symbols, then a first plurality of check vectors are created with all possible three symbol long, in-order combinations of the second set of symbols; a second plurality of check vectors are created with all possible four symbol long, in-order combinations of the second set of symbols; a third plurality of check vectors are created with all possible five symbol long, in-order combinations of the second set of symbols; and a fourth plurality of check vectors are created with all possible six symbol long, in-order combinations of the second set of symbols. By in-order, it is meant that an order of the characters in each of the check vectors is a same order as an order of the symbols in the second set of symbols.

In some examples, a distance between each of the credential subset vectors of a particular length and each of the plurality of check vectors of a same particular length is calculated. The distance quantities a difference between each check vector and each credential subset vector. In other examples, a distance between each combination (regardless of size) of the credential subset vectors and each of the plurality of check vectors is calculated.

The authenticator then determines if the second set of symbols includes a first subset of symbols matching a portion of the stored value. For example, the authenticator determines if the second set of symbols includes a subset of the stored credential (e.g., password). In some examples, to determine whether the second set of symbols includes the first subset matching a portion of the stored value, the system may utilize the distance metrics and whether at least one of the distance metrics is within a threshold distance of the credential subset vectors. If the second set of characters does not include a subset of the stored credential, then at operation 1460, access may be denied. If the second set of characters includes a subset of the stored credential, then processing moves to operation 1440.

At operation 1440, the authenticator determines whether the second set of symbols includes a second subset of unspecified symbols in one or more unspecified positions within the second set of symbols. For example, the authenticator determines whether noise symbols are added to the credential. In some examples, the authenticator may ensure that additional characters are entered to ensure that the user is secured from eavesdropping attacks. If there are no additional noise symbols added, then at operation 1460 access is denied. Otherwise, access may be granted at operation 1450. It is noted that the authenticator does not specify for any authentication attempt where the noise characters are to be placed, and what the noise characters are. This protects the user by preventing eavesdropping of these locations.

Figure 15:
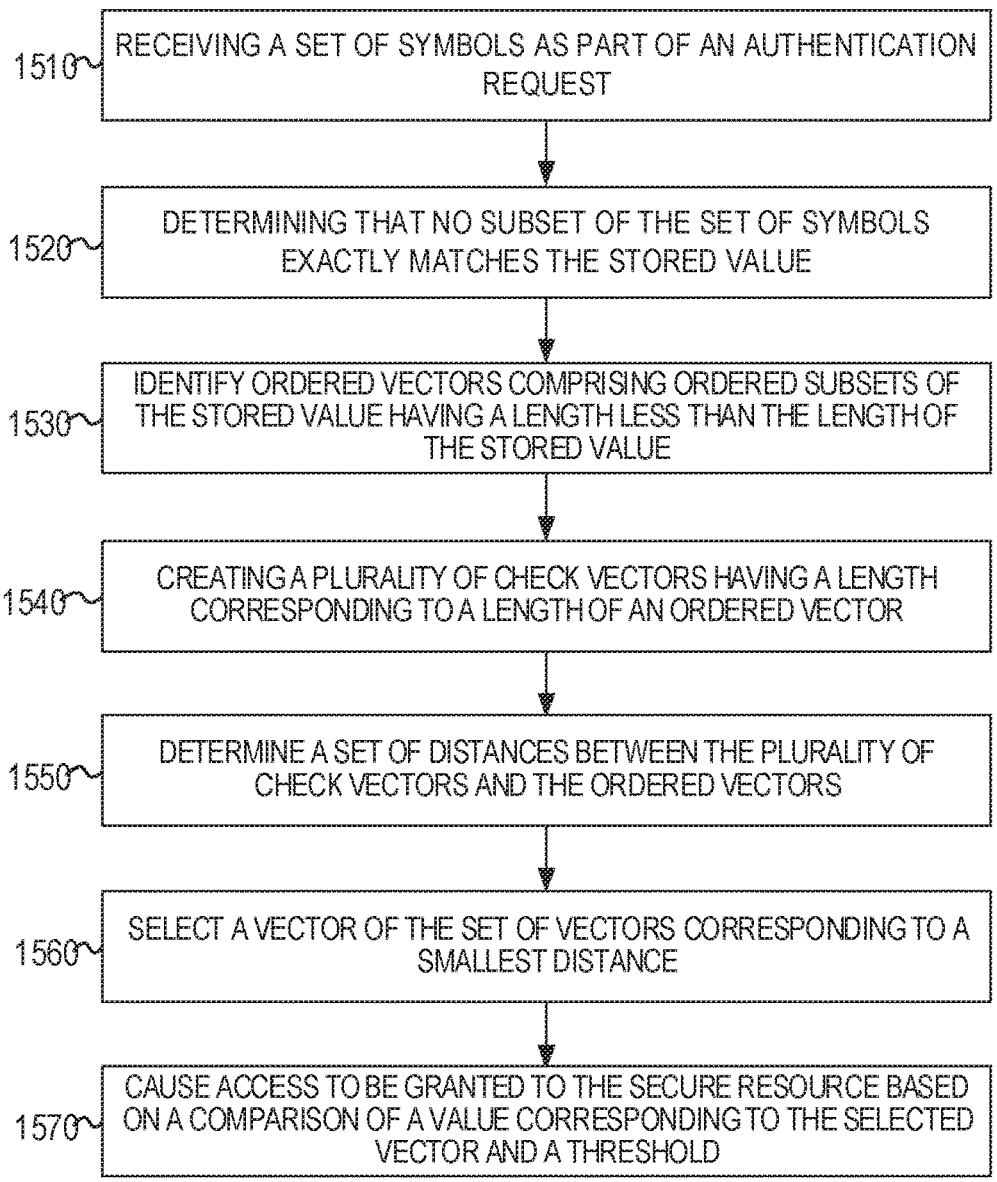

FIG. 15 illustrates a flowchart of a method 1500 of authenticating a user with a credential subset according to some examples of the present disclosure. At operation 1510 the authenticator may receive a set of symbols (e.g., submitted symbols) as part of an authentication request (e.g., an access request). At operation 1520, the authenticator determines that no subset of the set of submitted symbols exactly matches a stored value (e.g., a credential such as a password). This ensures that the entered credential is a subset and not the entire credential. If there is a subset of the received set of symbols that exactly matches the stored value, in some examples, authentication may fail.

At operation 1530, the authenticator may identify ordered vectors comprising ordered subsets of the stored value having a length less than the length of the stored value (e.g., the credential subset vectors). At operation 1540, the authenticator creates a plurality of check vectors having lengths corresponding to the lengths of the credential subset vectors. At operation 1550, the authenticator may determine a set of distances between the plurality of check vectors and the credential subset vectors. As noted, in some examples, the set of distances comprises distances between each combination of check vectors and credential subset vectors, but in other examples, the set of distances comprises only distances between each combination of same-sized check vectors and credential subset vectors (e.g., check vectors of size z and credential subset vectors of size z).

At operation 1560 the authenticator may select a check vector corresponding to a smallest distance. At operation 1570, the authenticator may cause access to be granted to a secure access-controlled resource based on a comparison of a value corresponding to the selected vector and a threshold. For example, the smallest distance value corresponding to the selected vector and the threshold. In other examples, a ratio of the smallest distance corresponding to the selected vector and a second smallest distance corresponding to the selected vector or a second check vector may be compared with a threshold.

Figure 16:
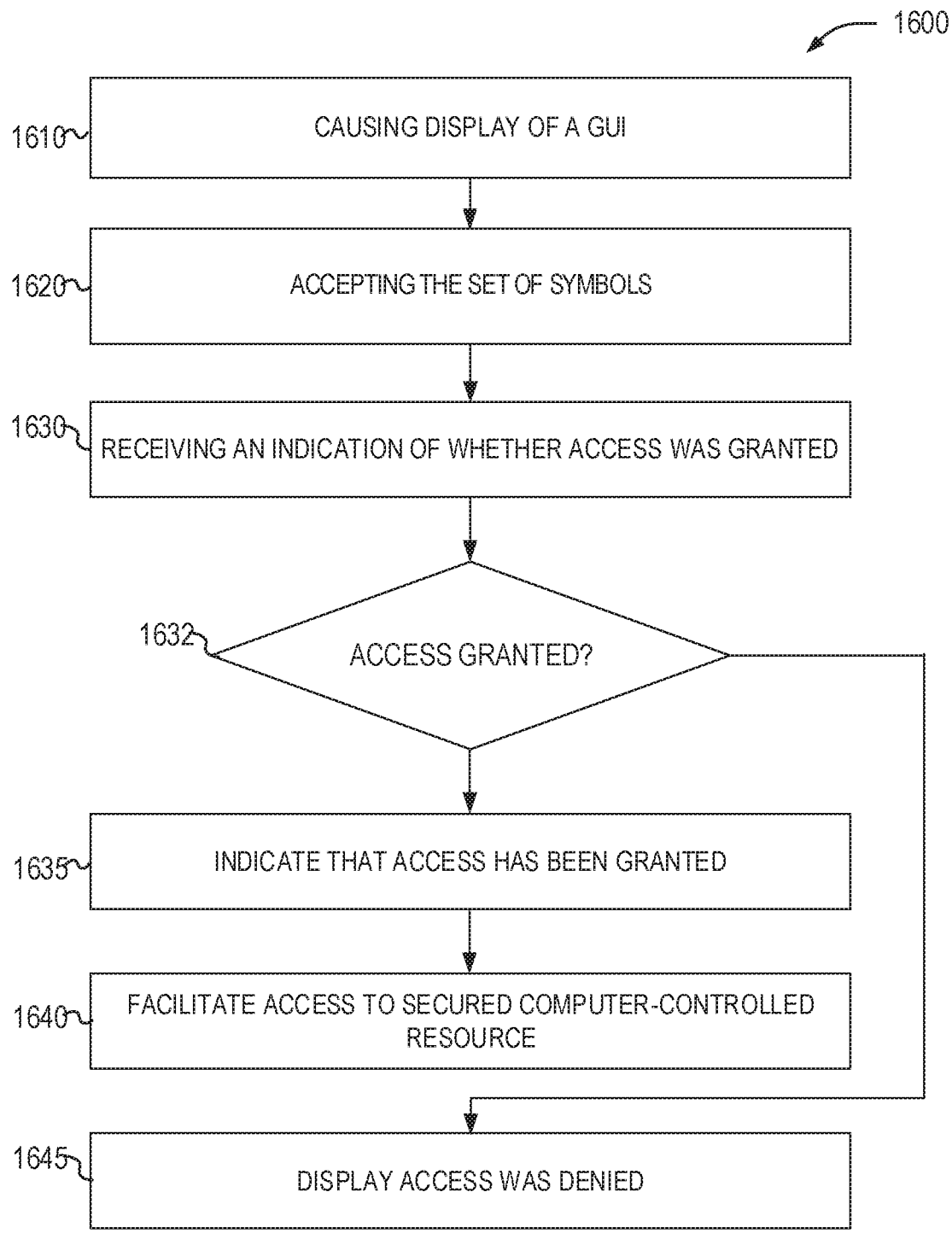

FIG. 16 illustrates a flowchart of a method 1600 of an authentication attempt using subsets according to some examples of the present disclosure. At operation 1610, the client may cause display of a GUI. For example, a GUI shown in FIG. 7. The GUI may have one or more data entry fields for entry of one or more symbols of one or more credentials by the user. For example, the GUI may comprise an input field for accepting characters of the requested authentication credential from an input device. In some examples, the GUI accepts the requested authentication credential in the form of a set of symbols (e.g., characters). Example input devices may include keyboards, on-screen keyboards, mouse inputs, touch inputs, biometric inputs, and the like. In some examples, the GUI may require that the set of symbols (e.g., characters) to include more symbols (e.g., characters) than a stored credential. For example, by checking a length of the characters entered by the user and checking that length against a length of a stored password. In some examples, the GUI may require that the set of characters to include a threshold amount of symbols more than a stored credential. The threshold may be prespecified or may be determined based on the length of the credential. For example, if the credential (e.g., password) is short, the system may require more noise symbols then if the credential is long. In other examples, the system may compare the values of the submitted symbols entered to the value of the symbols of the credential to determine if noise symbols were added.

In some examples, the client may check to make sure that the noise symbols (e.g., characters) are interspersed with the submitted credential. For example, if the noise symbols are at the beginning, end, or both beginning and end, but not interspersed within the submitted symbols, then the client may display an error. For example, if a measurement of spread of the noise symbols throughout the credential symbols is below a threshold, then the client may show an error and make the user fix the submitted symbols such that the measurement of spread is above or equal to the threshold. Measurement of spread is detailed in more depth below.

In some examples, the client may verify that the submitted symbols do not exactly match the stored credential, but instead includes a subset. For example, the client may compare the symbols as they are being entered with the stored credential to make sure that the user has entered a subset of a minimum and/or maximum length. If the submitted symbols do not include a subset of the credential, the GUI may display an error and make the user fix the submitted symbols such that the submitted symbols include a subset of the stored credential.

If any of the above checks indicate that the submitted symbols (e.g., characters) of the user do not meet one or more of the above requirements, the client may display an error and require the user to correct the submitted symbols. The error may be displayed once the user submits the symbols through an input specifying that entry of the symbols (e.g., characters) is complete (e.g., pressing ENTER, clicking or tapping a button indicating that entry is complete, or the like). In other examples, the system may monitor the symbols entered as the user inputs them. For example, after a predetermined number of symbols (e.g., the length of the stored credential), the system may check the symbols for length, noise symbols, and/or measurement of spread, depending on the implementation. An example warning to the user is shown in FIG. 8.

At operation 1620, the client may accept the symbols (e.g., characters) entered by the user in the one or more data entry fields of the GUI, where the set of symbols includes more characters than the stored credential and includes no subset of the set of characters that exactly matches the stored credential. For example, after the user has submitted an input to indicate that the set of symbols is complete and the set of characters meets the requirements (e.g., the length is greater than the credentials, the submitted symbols include noise characters, the noise is interspersed, and/or the noise is interspersed and the spread measurement is above a threshold). In an example, the requirements may not require that the length of the set of characters be greater than the credentials. For example, when the password is "password," a subset entered by the user with noise may be "p1a2s3s," which is fewer characters than "password" but may still be sufficiently secure.

At operation 1630, the client may receive or identify an indication of whether access was granted or not. In some examples, the client may send the submitted symbols to a remote authenticator in a remote computing device, such as shown in FIG. 2. The client may then receive the indication from the remote device of whether access was granted or not. In other examples, the client itself may include the authenticator and may perform the authentication as shown in FIG. 1, In these examples, the indication may be an indication of whether access was granted or not from the authenticator that is received through a function return, interprocess communication, or the like.

At operation 1632, the system may determine whether the indication was that access was granted or denied. If access is denied, then at operation 1645 the GUI may be caused to display a message that access was denied. In some examples, the user may retry the authentication. In some examples, a limit on the number of retry attempts may be implemented that prevents the user from retrying the authentication after a determined number of authentication failures within a determined amount of time.

If at operation 1632, access is granted, then at operation 1635 the system may indicate that access has been granted. For example, the system may cause the GUI to display an indication that access was granted. In other examples, the system may simply remove the login screen and reveal access to the access-controlled resource. In other examples, the system may provide the requested access-controlled resource. At operation 1640, in some examples, the client may facilitate access to the requested secure access-controlled resource, such as by redirecting a user's browser to an address for the resource, executing a function that provides the resource, or the like.

In some examples, the various features described above may be implemented alone, or in combination. For example, the system may require noise characters, enforce a maximum number of total characters, require a subset, require a noise character distribution that is within a range of measurement of spread, and require that the submitted symbols 1325 not be duplicated. In other examples, only certain features may be implemented, and others may not be implemented. In yet other examples, the features and requirements implemented may be configurable by an end user, an administrator, or the like. The preceding disclosure focused on the user of the authentication techniques to authenticate a user's credentials. However, as noted the credential is but one type of stored value that may be compared. The present techniques may be used generally to verify a received value to a stored value. In addition, in various flowcharts, the order of operations may be exemplary. For example, in HG. 10, operations 1030, 1040, and 1045 may be performed in any order depending on the implementation. This is but one example as other flowcharts may be reordered according to a desired implementation.

Figure 17:
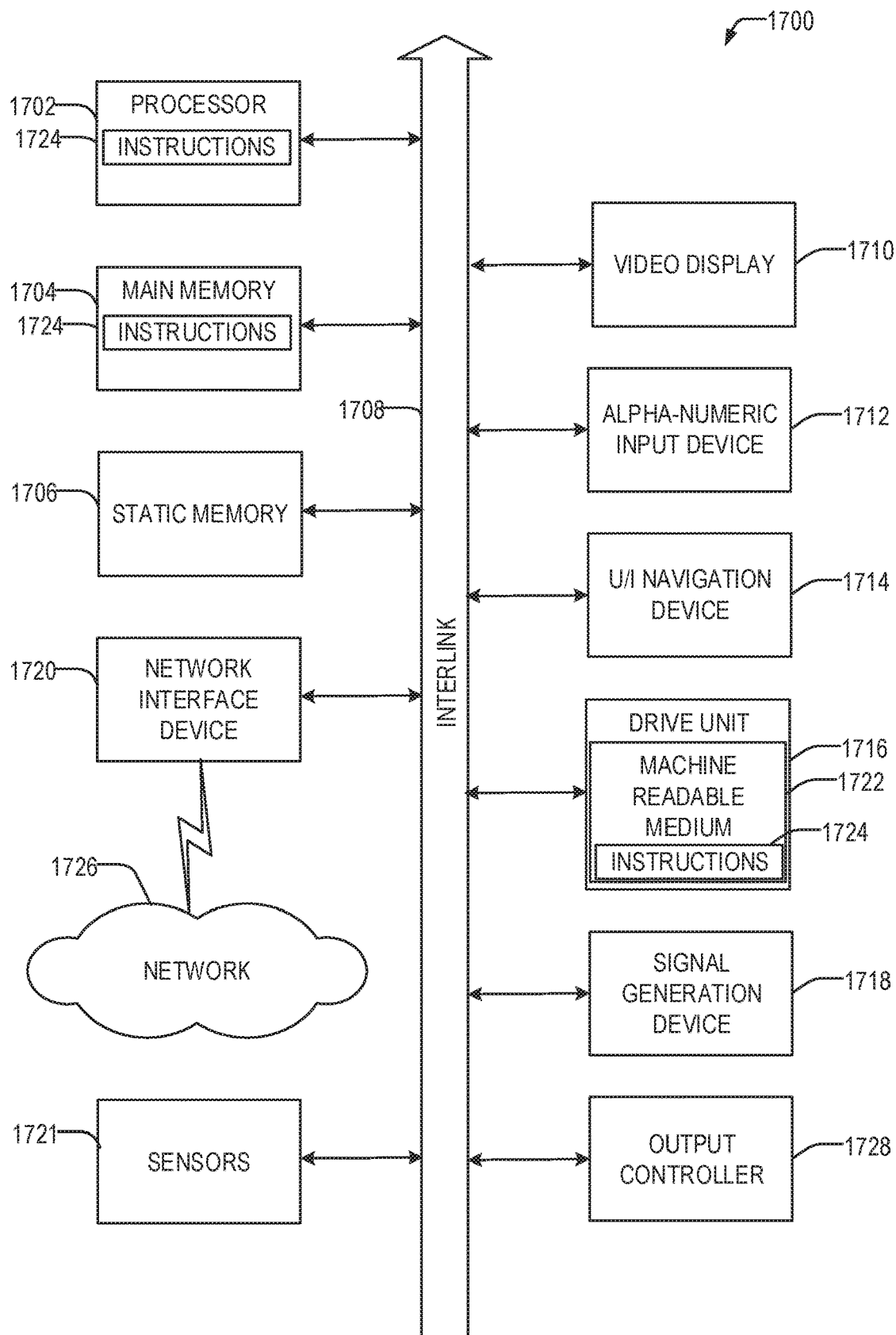
FIG. 17 illustrates a block diagram of an example machine which may implement one or more of the techniques (e.g., methodologies) discussed herein according to some examples of the present disclosure.

FIG. 17 illustrates a block diagram of an example machine 1700 which may implement one or more of the techniques (e.g., methodologies) discussed herein according to some examples of the present disclosure. In alternative embodiments, the machine 1700 may operate as a stand-alone device or may be connected (e.g., networked) to other machines. In a networked deployment, the machine 1700 may operate in the capacity of a server machine, a client machine, or both in server-client network environments. Machine 1700 may implement a user device 110, a remote device 135, a second remote device 255, and the like. For example, the machine 1700 may be configured to include any one or more of the components of FIGS. 3, 9, 12, and 13. The machine 1700 may be configured to perform the methods of FIGS. 4-6, 10, 11, and 14-16. The machine 1700 may be configured to provide the GUIs of FIGS. 7 and 8. In an example, the machine 1700 may act as a peer machine in peer-to-peer (P2P) (or other distributed) network environment. The machine 1700 may be a user device, a remote device, a second remote device or other device which may take the form of a personal computer (PC), a tablet PC, a set-top box (STB), a personal digital assistant (PIM), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1700 may include a hardware processor 1702 (e.g., a central processing unit (CPU), a graphics processing unit (GPU), a hardware processor core, or any combination thereof), a main memory 1704 and a static memory 1706, some or all of which may communicate with each other via an interlink (e.g., bus) 1708. The machine 1700 may further include a display unit 1710, an alphanumeric input device 1712 (e.g., a keyboard), and a user interface (UI) navigation device 1714 (e.g., a mouse). In an example, the display unit 1710, input device 1712 and UI navigation device 1714 may be a touch screen display. The machine 1700 may additionally include a storage device (e.g., drive unit) 1716, a signal generation device 1718 (e.g., a speaker), a network interface device 1720, and one or more sensors 1721, such as a global positioning system (GPS) sensor, compass, accelerometer, or other sensor. The machine 1700 may include an output controller 1728, such as a serial (e.g., universal serial bus (USB), parallel, or other wired or wireless (e.g., infrared (IR), near field communication (NTC), etc.) connection to communicate or control one or more peripheral devices (e.g., a printer, card reader, etc.).

The storage device 1716 may include a machine readable medium 1722 on which is stored one or more sets of data structures or instructions 1724 (e.g., software) embodying or utilized by any one or more of the techniques or functions described herein. The instructions 1724 may also reside, completely or at least partially, within the main memory 1704, within static memory 1706, or within the hardware processor 1702 during execution thereof by the machine 1700. In an example, one or any combination of the hardware processor 1702, the main memory 1704, the static memory 1706, or the storage device 1716 may constitute machine readable media.

While the machine readable medium 1722 is illustrated as a single medium, the term "machine readable medium" may include a single medium or multiple media (e.g., a centralized or distributed database, and/or associated caches and servers) configured to store the one or more instructions 1724.

The term "machine readable medium" may include any medium that is capable of storing, encoding, or carrying instructions for execution by the machine 1700 and that cause the machine 1700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may be non-transitory machine readable media. In some examples, machine readable media may include machine readable media that is not a transitory propagating signal.

The instructions 1724 may further be transmitted or received over a communications network 1726 using a transmission medium via the network interface device 1720. The Machine 1700 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1720 may include one or more physical jacks (e.g., Ethernet, coaxial, or phone jacks) or one or more antennas to connect to the communications network 1726. In an example, the network interface device 1720 may include a plurality of antennas to wirelessly communicate using at least one of single-input multiple-output (SEM), multiple-input multiple-output (MIMO), or multiple-input single-output (VINO) techniques. In some examples, the network interface device 1720 may wirelessly communicate using Multiple User MIMO techniques.

NON LIMITING EXAMPLES

Example 1 is a method for authentication, the method comprising: using one or more hardware processors: identifying a first set of characters corresponding to a stored password; receiving a second set of characters to be authenticated during an authentication attempt, wherein the received second set of characters to be authenticated include, more characters than the first set of characters corresponding to the stored password; and causing access to be granted to an access-controlled resource based upon determining that the second set of characters includes: a first subset of characters that match the first set of characters corresponding to the stored password and in a same order, and a second subset of characters that are not specified for the authentication attempt and are interleaved with the first subset of characters in an order that is not specified for the authentication attempt.

In Example 2, the subject matter of Example 1 includes, wherein determining that the second set of characters includes the first subset of characters that match the first set of characters corresponding to the stored password and in the same order comprises determining a match between portions of the second set of characters and the first set of characters based upon a distance function and a maximum distance threshold.

In Example 3, the subject matter of Examples 1-2 includes, wherein the second set of characters is received over a network.

In Example 4, the subject matter of Examples 1-3 includes, wherein the second set of characters is received from an input device communicatively coupled to the one or more hardware processors.

In Example 5, the subject matter of Examples 1-4 includes, wherein causing access to be granted to the access-controlled resource comprises sending an indication that access was granted to a computing device that controls the access-controlled resource.

In Example 6, the subject matter of Examples 1-5 includes, wherein determining that the second set of characters includes the first subset of characters comprises matching a plurality of vectors comprising permutations of the received second set of characters against the first set of characters.

In Example 7, the subject matter of Example 6 includes, wherein the matching the plurality of vectors comprising permutations of the received second set of characters against the first set of characters comprises comparing a distance derived from a distance function to a threshold.

In Example 8, the subject matter of Examples 1-7 includes, wherein the first set of characters are retrieved from a hardware storage device.

In Example 9, the subject matter of Examples 1-8 includes, storing information about the second set of characters; receiving a third set of characters entered during a second authentication attempt; and causing access to be denied to the access-controlled resource based upon determining that the third set of characters is within a threshold similarity of the second set of characters.

Example 10 is a device for authentication, the device comprising: one or more hardware processors; a memory, storing instructions, which when executed, cause the one or more hardware processors to perform operations comprising: identifying a first set of characters corresponding to a stored password; receiving a second set of characters to be authenticated during an authentication attempt, wherein the received second set of characters to be authenticated include, more characters than the first set of characters corresponding to the stored password; and causing access to be granted to an access-controlled resource based upon determining that the second set of characters includes: a first subset of characters that match the first set of characters corresponding to the stored password and in a same order, and a second subset of characters that are not specified for the authentication attempt and are interleaved with the first subset of characters in an order that is not specified for the authentication attempt.

In Example 11, the subject matter of Example 10 includes, wherein the operations of determining that the second set of characters includes the first subset of characters that match the first set of characters corresponding to the stored password and in the same order comprises determining a match between portions of the second set of characters and the first set of characters based upon a distance function and a maximum distance threshold.

In Example 12, the subject matter of Examples 10-11 includes, wherein the second set of characters is received over a network.

In Example 13, the subject matter of Examples 10-12 includes, wherein the second set of characters is received from an input device communicatively coupled to the one or more hardware processors.

In Example 14, the subject matter of Examples 10-13 includes, wherein the operations of causing access to be granted to the access-controlled resource comprises sending an indication that access was granted to a computing device that controls the access-controlled resource.

In Example 15, the subject matter of Examples 10-14 includes, wherein the operations of determining that the second set of characters includes the first subset of characters comprises matching a plurality of vectors comprising permutations of the received second set of characters against the first set of characters.

In Example 16, the subject matter of Example 15 includes, wherein the operations of matching the plurality of vectors comprising permutations of the received second set of characters against the first set of characters comprises comparing a distance derived from a distance function to a threshold.

In Example 17, the subject matter of Examples 10-16 includes, wherein the first set of characters are retrieved from a hardware storage device.

In Example 18, the subject matter of Examples 10-17 includes, wherein the operations further comprise: storing information about the second set of characters; receiving a third set of characters entered during a second authentication attempt; and causing access to be denied to the access-controlled resource based upon determining that the third set of characters is within a threshold similarity of the second set of characters.

Example 19 is a method for a password to be authenticated against a stored password, the method comprising: using one or more hardware processors: identifying a first set of characters corresponding to the stored password; receiving a second set of characters to be authenticated during an authentication attempt, wherein the received second set of characters to be authenticated include, more characters than the first set of characters corresponding to the stored password; causing access to be granted to an access controlled resource based upon determining: the second set of characters includes a first subset of characters that match the first set of characters corresponding to the stored password and in a same order, and a second subset of characters that are not specified for the authentication attempt and are interleaved with the first subset of characters in an order that is not specified for the authentication attempt, and the second set of characters comprises a first preset count of characters or the second subset of characters comprises a second preset count of characters.

In Example 20, the subject matter of Example 19 includes, storing information about the second set of characters; receiving a third set of characters to be authenticated during a second authentication attempt; and causing access to be denied to the access controlled resource based upon determining that the third set of characters is within a threshold similarity of the second set of characters.

In Example 21, the subject matter of Examples 19-20 includes, receiving a third set of characters to be authenticated during a second authentication attempt; and causing access to be granted to the access controlled resource based upon determining: the third set of characters includes a third subset of characters that match the first set of characters corresponding to the stored password and in a same order, and a fourth subset of characters that are not specified for the second authentication attempt and are interleaved with the third subset of characters in an order that is not specified for the second authentication attempt, and the third set of characters comprises the first preset count of characters or the fourth subset of characters comprises the second preset count of characters.

In Example 22, the subject matter of Examples 19-21 includes, wherein determining that the second set of characters includes the first subset of characters that match the first set of characters corresponding to the stored password and in the same order comprises determining a match between portions of the second set of characters and the first set of characters based upon a distance function and a maximum distance threshold.

In Example 23, the subject matter of Examples 19-22 includes, wherein the second set of characters is received over a network.

In Example 24, the subject matter of Examples 19-23 includes, wherein the second set of characters is received from an input device communicatively coupled to the one or more hardware processors.

In Example 25, the subject matter of Examples 19-24 includes, wherein causing access to be granted to an access controlled resource comprises sending an indication that access was granted to a computing device where the access controlled resource is at least partially located.

In Example 26, the subject matter of Examples 19-25 includes, wherein determining that the second set of characters includes the first subset of characters comprises matching a plurality of vectors comprising permutations of the received second set of characters against the first set of characters.

In Example 27, the subject matter of Example 26 includes, wherein the matching the plurality of vectors comprising permutations of the received second set of characters against the first set of characters comprises comparing a distance derived from a distance function to a threshold.

In Example 28, the subject matter of Examples 19-27 includes, denying access to be granted if the second set of characters does not consist of the first preset count of characters.

Example 29 is a device for authentication, the device comprising: one or more hardware processors; a memory, storing instructions, which when executed, cause the one or more hardware processors to perform operations comprising: identifying a first set of characters corresponding to a stored password; receiving a second set of characters to be authenticated during an authentication attempt, wherein the received second set of characters to be authenticated include, more characters than the first set of characters corresponding to the stored password; causing access to be granted to an access controlled resource based upon determining: the second set of characters includes a first subset of characters that match the first set of characters corresponding to the stored password and in a same order, and a second subset of characters that are not specified for the authentication attempt and are interleaved with the first subset of characters in an order that is not specified for the authentication attempt, and the second set of characters comprises a first preset count of characters or the second subset of characters comprises a second preset count of characters.

In Example 30, the subject matter of Example 29 includes, wherein the operations further comprise: storing information about the second set of characters; receiving a third set of characters to be authenticated during a second authentication attempt; and causing access to be denied to the access controlled resource based upon determining that the third set of characters is within a threshold similarity of the second set of characters.

In Example 31, the subject matter of Examples 29-30 includes, wherein the operations further comprise: receiving a third set of characters to be authenticated during a second authentication attempt; and causing access to be granted to the access controlled resource based upon determining: the third set of characters includes a third subset of characters that match the first set of characters corresponding to the stored password and in a same order, and a fourth subset of characters that are not specified for the second authentication attempt and are interleaved with the third subset of characters in an order that is not specified for the second authentication attempt, and the third set of characters comprises the first preset count of characters or the fourth subset of characters comprises the second preset count of characters.

In Example 32, the subject matter of Examples 29-31 includes, wherein the operations of determining that the second set of characters includes the first subset of characters that match the first set of characters corresponding to the stored password and in the same order comprises determining a match between portions of the second set of characters and the first set of characters based upon a distance function and a maximum distance threshold.

In Example 33, the subject matter of Examples 29-32 includes, wherein the second set of characters is received over a network.

In Example 34, the subject matter of Examples 29-33 includes, wherein the second set of characters is received from an input device communicatively coupled to the one or more hardware processors.

In Example 35, the subject matter of Examples 29-34 includes, wherein the operations of causing access to be granted to an access controlled resource comprises sending an indication that access was granted to a computing device where the access controlled resource is at least partially located.

In Example 36, the subject matter of Examples 29-35 includes, wherein the operations of determining that the second set of characters includes the first subset of characters comprises matching a plurality of vectors comprising permutations of the received second set of characters against the first set of characters.

In Example 37, the subject matter of Example 36 includes, wherein the operations of matching the plurality of vectors comprising permutations of the received second set of characters against the first set of characters comprises comparing a distance derived from a distance function to a threshold.

In Example 38, the subject matter of Examples 29-37 includes, wherein the operations of causing access to be granted to the access control led resource comprises denying access to be granted if the second set of characters does not consist of the first preset count of characters.

Example 39 is a method for authenticating a received set of symbols against a stored value during an authentication attempt, the method comprising: using one or more hardware processors: receiving the set of symbols to be authenticated during the authentication attempt, wherein the received set of symbols includes, more symbols than a first set of symbols corresponding to the stored value; creating a set of two or more vectors, each vector having a length corresponding to a length of an ordered vector comprising the first set of symbols corresponding to the stored value and each vector comprising a different ordered combination of the received set of symbols, the different ordered combination of the received set of symbols ordered in a same order as the symbols were received; determining a set of distances between each respective vector and the ordered vector comprising the first set of symbols corresponding to the stored value; selecting a vector of the set of vectors corresponding to a smallest distance of the set of distances; and causing access to be granted to an access-controlled resource based on a comparison of a value corresponding to the selected vector and a threshold.

In Example 40, the subject matter of Example 39 includes, wherein causing access to be granted to the access-controlled resource based upon the comparison of the value corresponding to the selected vector and the threshold comprises determining that the smallest distance is less than the threshold.

In Example 41, the subject matter of Examples 39-40 includes, selecting a second vector of the set of vectors corresponding to a next smallest distance of the set of distances, the second vector different than the selected vector corresponding to the smallest distance; and wherein causing access to be granted to the access controlled resource based upon the comparison of the value corresponding to the selected vector corresponding to the smallest distance and the threshold comprises determining that a value calculated based upon the smallest and next smallest distances corresponding to the respective selected vector corresponding to the smallest distance and second vector is less than the threshold.

In Example 42, the subject matter of Example 41 includes, wherein the value is one of: a ratio of the smallest and next smallest distances or a difference between the smallest and next smallest distances.

In Example 43, the subject matter of Examples 39-42 includes, wherein determining the set of distances between each respective vector and the ordered vector comprising the stored value comprises determining a correlation between the respective vector and the ordered vector.

In Example 44, the subject matter of Examples 39-43 includes, wherein determining the set of distances between each respective vector and the ordered vector comprising the stored value comprises determining Hamming distances between each respective vector and the ordered vector.

In Example 45, the subject matter of Examples 39-44 includes, receiving a second set of symbols as part of a second authentication attempt; determining a length of the second received set of symbols; determining that the length of the second received set of symbols transgresses a threshold length; and responsive to determining that the length of the second received set of symbols transgresses the threshold length, causing access to be rejected to the access-controlled resource.

In Example 46, the subject matter of Examples 39-45 includes, receiving a second set of symbols as part of a second authentication attempt; identifying a distance metric quantifying a difference between the first set of symbols and the second set of symbols; determining that the distance metric is below a determined threshold; and based upon determining that the distance metric is below the determined threshold, causing access to be rejected to the access-controlled resource.

Example 47 is a device for authenticating a received set of symbols against a stored value during an authentication attempt, the device comprising: one or more hardware processors; a memory, comprising instructions, which when executed by the one or more hardware processors, cause the device to perform operations comprising: receiving the set of symbols to be authenticated during the authentication attempt, wherein the received set of symbols includes, more symbols than a first set of symbols corresponding to the stored value; creating a set of two or more vectors, each vector having a length corresponding to a length of an ordered vector comprising the first set of symbols corresponding to the stored value and each vector comprising a different ordered combination of the received set of symbols, the different ordered combination of the received set of symbols ordered in a same order as the symbols were received; determining a set of distances between each respective vector and the ordered vector comprising the first set of symbols corresponding to the stored value; selecting a vector of the set of vectors corresponding to a smallest distance of the set of distances; and causing access to be granted to an access-controlled resource based on a comparison of a value corresponding to the selected vector and a threshold.

In Example 48, the subject matter of Example 47 includes, wherein the operations of causing access to be granted to the access-controlled resource based upon the comparison of the value corresponding to the selected vector and the threshold comprises determining that the smallest distance is less than the threshold.

In Example 49, the subject matter of Examples 47-48 includes, wherein the operations further comprise: selecting a second vector of the set of vectors corresponding to a next smallest distance of the set of distances, the second vector different than the selected vector corresponding to the smallest distance; and wherein causing access to be granted to the access controlled resource based upon the comparison of the value corresponding to the selected vector corresponding to the smallest distance and the threshold comprises determining that a value calculated based upon the smallest and next smallest distances corresponding to the respective selected vector corresponding to the smallest distance and second vector is less than the threshold.

In Example 50, the subject matter of Example 49 includes, wherein the value is one of: a ratio of the smallest and next smallest distances or a difference between the smallest and next smallest distances.

In Example 51, the subject matter of Examples 47-50 includes, wherein the operations of determining the set of distances between each respective vector and the ordered vector comprising the stored value comprises determining a correlation between the respective vector and the ordered vector.

In Example 52, the subject matter of Examples 47-51 includes, wherein the operations of determining the set of distances between each respective vector and the ordered vector comprising the stored value comprises determining Hamming distances between each respective vector and the ordered vector.

In Example 53, the subject matter of Examples 47-52 includes, wherein the operations further comprise: receiving a second set of symbols as part of a second authentication attempt; determining a length of the second received set of symbols; determining that the length of the second received set of symbols transgresses a threshold length; and responsive to determining that the length of the second received set of symbols transgresses the threshold length, causing access to be rejected to the access-controlled resource.

In Example 54, the subject matter of Examples 47-53 includes, wherein the operations further comprise: receiving a second set of symbols as part of a second authentication attempt; identifying a distance metric quantifying a difference between the first set of symbols and the second set of symbols; determining that the distance metric is below a determined threshold; and based upon determining that the distance metric is below the determined threshold, causing access to be rejected to the access-controlled resource.

Example 55 is a method for authenticating access to an access-controlled resource, the method comprising: using one or more hardware processors: causing a graphical user interface (GUI) to be displayed requesting an authentication credential for an authentication attempt, the GUI comprising an input field for accepting the requested authentication credential from an input device in the form of a set of characters, the GUI requiring the set of characters to include, more characters than a stored credential; accepting the set of characters from the input field upon receipt of an input to the GUI that the set of characters is complete, the set of characters including more characters than the stored credential; receiving an indication that the accepted set of characters includes: a first subset of characters that match the stored credential and in a same order, and a second subset of characters that are not specified for the authentication attempt and are interleaved with the first subset of characters in an order that is not specified for the authentication attempt; and responsive to receiving the indication, allowing access to the access-controlled resource.

In Example 56, the subject matter of Example 55 includes, wherein the input to the GUI that the set of characters is complete comprises pressing of an enter key or an input directed to a submission button.

In Example 57, the subject matter of Examples 55-56 includes, wherein the authentication credential is a password.

In Example 58, the subject matter of Examples 55-57 includes, wherein the GUI displays a visual indicator when the set of characters does not include more than a number of characters in the stored credential.

In Example 59, the subject matter of Examples 55-58 includes, wherein the GUI displays a visual indicator when the set of characters does not include a set of noise characters.

In Example 60, the subject matter of Examples 55-59 includes, wherein the GUI displays a visual indicator when the set of characters does not include a set of noise characters that are distributed within a set of characters corresponding to the stored credential, and wherein the GUI further requires that the set of characters include the set of noise characters distributed within the set of characters corresponding to the stored credential.

In Example 61, the subject matter of Example 60 includes, wherein the GUI displays the visual indicator when a measure of spread of the noise characters in the set of characters corresponding to the stored credential does not meet a threshold, and wherein the GUI further requires that the measure of spread of the set of noise characters within the set of characters meet the threshold.

In Example 62, the subject matter of Examples 55-61 includes, determining that the set of characters comprises the first subset and the second subset.

In Example 63, the subject matter of Examples 55-62 includes, receiving the indication that the set of characters includes the first subset and the second subset.

Example 64 is a device for authenticating access to an access-controlled resource, the device comprising: one or more hardware processors; a memory, comprising instructions, which when executed by the one or more hardware processors, cause the device to perform operations comprising: causing a graphical user interface (GUI) to be displayed requesting an authentication credential for an authentication attempt, the GUI comprising an input field for accepting the requested authentication credential from an input device in the form of a set of characters, the GUI requiring the set of characters to include, more characters than a stored credential; accepting the set of characters from the input field upon receipt of an input to the GUI that the set of characters is complete, the set of characters including more characters than the stored credential; receiving an indication that the accepted set of characters includes: a first subset of characters that match the stored credential and in a same order, and a second subset of characters that are not specified for the authentication attempt and are interleaved with the first subset of characters in an order that is not specified for the authentication attempt; and responsive to receiving the indication, allowing access to the access-controlled resource.

In Example 65, the subject matter of Example 64 includes, wherein the input to the GUI that the set of characters is complete comprises pressing of an enter key or an input directed to a submission button.

In Example 66, the subject matter of Examples 64-65 includes, wherein the authentication credential is a password.

In Example 67, the subject matter of Examples 64-66 includes, wherein the GUI displays a visual indicator when the set of characters does not include more than a number of characters in the stored credential.

In Example 68, the subject matter of Examples 64-67 includes, wherein the GUI displays a visual indicator when the set of characters does not include a set of noise characters.

In Example 69, the subject matter of Examples 64-68 includes, wherein the GUI displays a visual indicator when the set of characters does not include a set of noise characters that are distributed within a set of characters corresponding to the stored credential, and wherein the GUI further requires that the set of characters include the set of noise characters distributed within the set of characters corresponding to the stored credential.

In Example 70, the subject matter of Example 69 includes, wherein the GUI displays the visual indicator when a measure of spread of the noise characters in the set of characters corresponding to the stored credential does not meet a threshold, and wherein the GUI further requires that the measure of spread of the set of noise characters within the set of characters meet the threshold.

In Example 71, the subject matter of Examples 64-70 includes, wherein the operations further comprise: determining that the set of characters comprises the first subset and the second subset.

In Example 72, the subject matter of Examples 64-71 includes, wherein the operations further comprise receiving the indication that the set of characters includes the first subset and the second subset.

Example 73 is a method for a password to be authenticated against a stored password, the method comprising: using one or more hardware processors: identifying a first set of characters corresponding to the stored password; receiving a second set of characters to be authenticated during an authentication attempt, wherein the received second set of characters to be authenticated include, more characters than the first set of characters corresponding to the stored password; and causing access to be granted to an access controlled resource based upon determining that the second set of characters includes: a first subset of characters that match the first set of characters corresponding to the stored password and in a same order, and a second subset of characters that are not specified for the authentication attempt and are distributed with the first subset of characters in an order that is not specified for the authentication attempt, wherein a measure of spread of respective positions of characters of the first subset or the second subset within the second set of characters is within a threshold range.

In Example 74, the subject matter of Example 73 includes, wherein the measure of spread of the respective positions of the first subset or the second subset comprises a greatest distance between respective positions of subsequent ones of the second subset of characters within the second set of characters.

In Example 75, the subject matter of Examples 73-74 includes, wherein the measure of spread of the respective positions of the first subset or the second subset comprises an average distance between respective positions of subsequent ones of the second subset of characters within the second set of characters.

In Example 76, the subject matter of Examples 73-75 includes, wherein the measure of spread of the respective positions of the first subset or the second subset comprises a variance of the respective positions of the second subset of characters within the second set of characters.

In Example 77, the subject matter of Examples 73-76 includes, wherein the second set of characters is received over a network.

In Example 78, the subject matter of Examples 73-77 includes, wherein the second set of characters is received from an input device communicatively coupled to the one or more hardware processors.

In Example 79, the subject matter of Examples 73-78 includes, wherein determining that the second set of characters includes the first subset of characters comprises matching a plurality of vectors comprising permutations of the received second set of characters against the first set of characters.

In Example 80, the subject matter of Example 79 includes, wherein the matching the plurality of vectors comprising permutations of the received second set of characters against the first set of characters comprises comparing a distance derived from a distance function to a threshold.

In Example 81, the subject matter of Examples 73-80 includes, storing information about the second set of characters; receiving a third set of characters entered during a second authentication attempt; and causing access to be denied to the access controlled resource based upon determining that the third set of characters is within a threshold similarity of the second set of characters.

Example 82 is a device for authentication, the device comprising: one or more hardware processors; a memory, storing instructions, which when executed, cause the one or more hardware processors to perform operations comprising: identifying a first set of characters corresponding to a stored password; receiving a second set of characters to be authenticated during an authentication attempt, wherein the received second set of characters to be authenticated include, more characters than the first set of characters corresponding to the stored password; and causing access to be granted to an access controlled resource based upon determining that the second set of characters includes: a first subset of characters that match the first set of characters corresponding to the stored password and in a same order, and a second subset of characters that are not specified for the authentication attempt and are distributed with the first subset of characters in an order that is not specified for the authentication attempt, wherein a measure of spread of respective positions of characters of the first subset or the second subset within the second set of characters is within a threshold range.

In Example 83, the subject matter of Example 82 includes, wherein the measure of spread of the respective positions of the first subset or the second subset comprises a greatest distance between respective positions of subsequent ones of the second subset of characters within the second set of characters.

In Example 84, the subject matter of Examples 82-83 includes, wherein the measure of spread of the respective positions of the first subset or the second subset comprises an average distance between respective positions of subsequent ones of the second subset of characters within the second set of characters.

In Example 85, the subject matter of Examples 82-84 includes, wherein the measure of spread of the respective positions of the first subset or the second subset comprises a variance of the respective positions of the second subset of characters within the second set of characters.

In Example 86, the subject matter of Examples 82-85 includes, wherein the second set of characters is received over a network.

In Example 87, the subject matter of Examples 82-86 includes, wherein the second set of characters is received from an input device communicatively coupled to the one or more hardware processors.

In Example 88, the subject matter of Examples 82-87 includes, wherein the operations of determining that the second set of characters includes the first subset of characters comprises matching a plurality of vectors comprising permutations of the received second set of characters against the first set of characters.

In Example 89, the subject matter of Example 88 includes, wherein the operations of matching the plurality of vectors comprising permutations of the received second set of characters against the first set of characters comprises comparing a distance derived from a distance function to a threshold.

In Example 90, the subject matter of Examples 82-89 includes, wherein the operations further comprise: storing information about the second set of characters; receiving a third set of characters entered during a second authentication attempt; and causing access to be denied to the access controlled resource based upon determining that the third set of characters is within a threshold similarity of the second set of characters.

Example 91 is a method for authenticating access to an access-controlled resource, the method comprising: using one or more hardware processors: causing a graphical user interface (GUI) to be displayed requesting an authentication credential to access the access-controlled resource, the GUI comprising an input field for accepting the requested authentication credential from an input device in the form of a set of characters, the GUI requiring the set of characters to include, at least one character in addition to characters in a stored credential; accepting the set of characters from the input field upon receipt of an input to the GUI that the set of characters is complete, the set of characters including more characters than the stored credential, and including no subset of the set of characters that exactly matches the stored credential in entirety; receiving an indication that the set of characters includes a first subset of characters that match a portion of the stored credential, the matched portion of the stored credential having fewer characters than the stored credential and in a same order; and responsive to receiving the indication, displaying on the GUI that access has been granted to the access-controlled resource.

In Example 92, the subject matter of Example 91 includes, wherein the set of characters of the input to the GUI are required to have a number of characters of a predetermined length.

In Example 93, the subject matter of Examples 91-92 includes, wherein access to the access-controlled resource is rejected based on a determination that the matched portion of the set of characters equals the first set of characters in entirety.

In Example 94, the subject matter of Examples 91-93 includes, receiving a second set of characters from the input field during a subsequent authentication attempt; and displaying, in the GUI, the indication that access has been granted to the access-controlled resource based on determining that: the second set of characters includes: a third subset of characters that match a second portion of the stored credential having fewer characters than the stored credential and in a same order; and a minimum number of additional characters interspersed with the third subset of characters; and the first subset of characters differs from the third subset of characters.

In Example 95, the subject matter of Examples 91-94 includes, receiving a second set of characters from the input field during a subsequent authentication attempt; and displaying, in the GUI, the indication that access has been granted to the access-controlled resource based on determining that: the second set of characters includes: a third subset of characters that match a second portion of the stored credential having fewer characters than the stored credential and in a same order; and a minimum number of additional characters interspersed with the third subset of characters; and the additional characters differ from a second subset of characters interleaved with the first subset.

In Example 96, the subject matter of Examples 91-95 includes, wherein displaying the indication that access has been granted to the access-controlled resource includes determining that the first subset of characters includes a minimum number of characters corresponding to the stored credential.

In Example 97, the subject matter of Examples 91-96 includes, wherein the first subset of characters are determined to match the portion of the stored credential based on a distance function and a maximum distance threshold.

In Example 98, the subject matter of Example 97 includes, wherein displaying the indication that access has been granted to the access-controlled resource includes determining that the first subset of characters are a distance from the portion of the stored credential that is less than the maximum distance threshold and greater than a zero distance threshold.

In Example 99, the subject matter of Examples 97-98 includes, wherein displaying the indication that access has been granted to the access-controlled resource includes determining that a ratio of a distance of the first subset of characters to the portion of the stored credential compared to a distance of a third subset of characters to the portion of the stored credential exceeds a minimum ratio threshold.

In Example 100, the subject matter of Examples 91-99 includes, monitoring entry of a second set of characters as they are entered; determining that the second set of characters does not include a second subset of characters interleaved with the first subset; and displaying an indication to enter the second subset prior to completion of entry of the second set of characters.

In Example 101, the subject matter of Examples 91-100 includes, monitoring entry of a second set of characters as they are entered; determining that the second set of characters includes the stored credential in its entirety; and displaying an indication to remove at least one character from the second set of characters corresponding to the stored credential prior to completion of entry of the second set of characters.

In Example 102, the subject matter of Examples 91-101 includes, wherein the GUI requires the set of characters to not include the stored credential in its entirety.

In Example 103, the subject matter of Examples 91-102 includes, wherein the set of characters is indicated to include a second subset of characters that are not specified for the access-controlled resource and are interleaved with the first subset of characters in an order that is not specified.

Example 104 is a device for authenticating access to an access-controlled resource, the device comprising: one or more hardware processors; a memory, storing instructions, which when executed, cause the one or more hardware processors to perform operations comprising: causing a graphical user interface (GUI) to be displayed requesting an authentication credential to access the access-controlled resource, the GUI comprising an input field for accepting the requested authentication credential from an input device in the form of a set of characters, the GUI requiting the set of characters to include, at least one character in addition to characters in a stored credential; accepting the set of characters from the input field upon receipt of an input to the GUI that the set of characters is complete, the set of characters including more characters than the stored credential, and including no subset of the set of characters that exactly matches the stored credential in entirety; receiving an indication that the set of characters includes a first subset of characters that match a portion of the stored credential, the matched portion of the stored credential having fewer characters than the stored credential and in a same order; and responsive to receiving the indication, displaying on the GUI that access has been granted to the access-controlled resource.

In Example 105, the subject matter of Example 104 includes, wherein the set of characters of the input to the GUI are required to have a number of characters of a predetermined length, In Example 106, the subject matter of Examples 104-105 includes, wherein access to the access-controlled resource is rejected based on a determination that the matched portion set f characters equals the first set of characters in entirety.

In Example 107, the subject matter of Examples 104-106 includes, operations of: receiving a second set of characters from the input field during a subsequent authentication attempt; and displaying, in the GUI, the indication that access has been granted to the access-controlled resource based on determining that: the second set of characters includes: a third subset of characters that match a second portion of the stored credential having fewer characters than the stored credential and in a same order; and a minimum number of additional characters interspersed with the third subset of characters; and the first subset of characters differs from the third subset of characters.

In Example 108, the subject matter of Examples 104-107 includes, operations of: receiving a second set of characters from the input field during a subsequent authentication attempt; and displaying, in the GUI, the indication that access has been granted to the access-controlled resource based on determining that: the second set of characters includes: a third subset of characters that match a second portion of the stored credential having fewer characters than the stored credential and in a same order; and a minimum number of additional characters interspersed with the third subset of characters; and the additional characters differ from a second subset of characters interleaved with the first subset.

In Example 109, the subject matter of Examples 104-108 includes, wherein the operations of displaying the indication that access has been granted to the access-controlled resource includes determining that the first subset of characters includes a minimum number of characters corresponding to the stored credential.

In Example 110, the subject matter of Examples 104-109 includes, wherein the first subset of characters are determined to match the portion of the stored credential based on a distance function and a maximum distance threshold.

In Example 111, the subject matter of Example 110 includes, wherein the operations of displaying the indication that access has been granted to the access-controlled resource includes determining that the first subset of characters are a distance from the portion of the stored credential that is less than the maximum distance threshold and greater than a zero distance threshold.

In Example 112, the subject matter of Examples 110-111 includes, wherein the operations of displaying the indication that access has been granted to the access-controlled resource includes determining that a ratio of a distance of the first subset of characters to the portion of the stored credential compared to a distance of a third subset of characters to the portion of the stored credential exceeds a minimum ratio threshold.

In Example 113, the subject matter of Examples 104-112 includes, operations of: monitoring entry of a second set of characters as they are entered; determining that the second set of characters does not include a second subset of characters interleaved with the first subset; and displaying an indication to enter the second subset prior to completion of entry of the second set of characters.

In Example 114, the subject matter of Examples 104-113 includes, operations of: monitoring entry of a second set of characters as they are entered; determining that the second set of characters includes the stored credential in its entirety; and displaying an indication to remove at least one character from the second set of characters corresponding to the stored credential prior to completion of entry of the second set of characters.

In Example 115, the subject matter of Examples 104-114 includes, wherein the GUI requires the set of characters to not include the stored credential in its entirety.

In Example 116, the subject matter of Examples 104-115 includes, wherein the set of characters is indicated to include a second subset of characters that are not specified for the access-controlled resource and are interleaved with the first subset of characters in an order that is not specified.

Example 117 is a method for authenticating a password to be authenticated against a stored password comprising a first set of characters, the method comprising: using one or more hardware processors: receiving a second set of characters to be authenticated during an authentication attempt; and causing access to be granted to an access-controlled resource based on: determining that no subset of the second set of characters matches the first set of characters corresponding to the stored password; and determining that the second set of characters includes: a first subset of the second set of characters that match a portion of the first set of characters corresponding to the stored password, the portion of the first set of characters having fewer characters than the first set of characters and in a same order; and a minimum number of additional characters interspersed with the first subset of characters.

In Example 118, the subject matter of Example 117 includes, receiving a third set of characters to be authenticated during a second authentication attempt; and rejecting access to the access-controlled resource based on a determination that a portion of the third set of characters equals the first set of characters.

In Example 119, the subject matter of Examples 117-118 includes, receiving a third set of characters during a second authentication attempt; and causing access to be granted to the access-controlled resource based on determining that the third set of characters includes: a second subset of characters that match a portion of the first set of characters corresponding to the stored password, the portion of the first set of characters having fewer characters than the first set of characters and in a same order; and the minimum number of second additional characters interspersed with the first subset of characters, and wherein the first subset of characters differs from the second subset of characters.

In Example 120, the subject matter of Examples 117-119 includes, receiving a third set of characters during a second authentication attempt; and causing access to be granted to the access-controlled resource based on determining that the third set of characters includes: a second subset of characters that match a portion of the first set of characters corresponding to the stored password, the portion of the first set of characters having fewer characters than the first set of characters and in a same order; and the minimum number of second additional characters interspersed with the first subset of characters, and wherein the second additional characters differ from the additional characters.

In Example 121, the subject matter of Examples 117-120 includes, wherein causing access to be granted to the access-control led resource includes determining that the portion of the first set of characters includes a minimum number of characters corresponding to the stored password, In Example 122, the subject matter of Examples 117-121 includes, wherein determining that the second set of characters includes the first subset of characters includes determining a match between portions of the second set of characters and the first subset of characters based on a distance function and a maximum distance threshold.

In Example 123, the subject matter of Example 122 includes, wherein causing access to be granted to the access-control led resource includes determining that the first subset of characters are a distance from the second set of characters that is less than the maximum distance threshold and greater than a zero distance threshold.

In Example 124, the subject matter of Examples 122-123 includes, wherein causing access to be granted to the access-controlled resource includes determining that a ratio of a distance of the first subset of characters to the second set of characters compared to a distance of a second subset of characters to the second set of characters exceeds a minimum ratio threshold.

In Example 125, the subject matter of Examples 117-124 includes, wherein determining that the second set of characters includes the first subset of characters includes matching a plurality of vectors comprising permutations of the received second set of characters against the first set of characters.

Example 126 is a device for authenticating a password to be authenticated against a stored password comprising a first set of characters, the device comprising: one or more hardware processors; a memory, storing instructions, which when executed, cause the one or more hardware processors to perform operations comprising: receiving a second set of characters to be authenticated during an authentication attempt; and causing access to be granted to an access-controlled resource based on: determining that no subset of the second set of characters matches the first set of characters corresponding to the stored password; and determining that the second set of characters includes: a first subset of the second set of characters that match a portion of the first set of characters corresponding to the stored password, the portion of the first set of characters having fewer characters than the first set of characters and in a same order; and a minimum number of additional characters interspersed with the first subset of characters.

In Example 127, the subject matter of Example 126 includes, wherein the operations further comprise: receiving a third set of characters to be authenticated during a second authentication attempt; and rejecting access to the access-controlled resource based on a determination that a portion of the third set of characters equals the first set of characters.

In Example 128, the subject matter of Examples 126-127 includes, operations of: receiving a third set of characters during a second authentication attempt; and causing access to be granted to the access-controlled resource based on determining that the third set of characters includes: a second subset of characters that match a portion of the first set of characters corresponding to the stored password, the portion of the first set of characters having fewer characters than the first set of characters and in a same order; and the minimum number of second additional characters interspersed with the first subset of characters, and wherein the first subset of characters differs from the second subset of characters.

In Example 129, the subject matter of Examples 126-128 includes, operations of: receiving a third set of characters during a second authentication attempt; and causing access to be granted to the access-controlled resource based on determining that the third set of characters includes: a second subset of characters that match a portion of the first set of characters corresponding to the stored password, the portion of the first set of characters having fewer characters than the first set of characters and in a same order; and the minimum number of second additional characters interspersed with the first subset of characters, and wherein the second additional characters differ from the additional characters.

In Example 130, the subject matter of Examples 126-129 includes, wherein the operations of causing access to be granted to the access-controlled resource includes determining that the portion of the first set of characters includes a minimum number of characters corresponding to the stored password.

In Example 131, the subject matter of Examples 126-130 includes, wherein the operations of determining that the second set of characters includes the first subset of characters includes determining a match between portions of the second set of characters and the first subset of characters based on a distance function and a maximum distance threshold.

In Example 132, the subject matter of Example 131 includes, wherein the operations of causing access to be granted to the access-controlled resource includes determining that the first subset of characters are a distance from the second set of characters that is less than the maximum distance threshold and greater than a zero distance threshold.

In Example 133, the subject matter of Examples 131-132 includes, wherein the operations of causing access to be granted to the access-controlled resource includes determining that a ratio of a distance of the first subset of characters to the second set of characters compared to a distance of a second subset of characters to the second set of characters exceeds a minimum ratio threshold.

In Example 134, the subject matter of Examples 126-133 includes, wherein the operations of determining that the second set of characters includes the first subset of characters includes matching a plurality of vectors comprising permutations of the received second set of characters against the first set of characters.

Example 135 is a method for verifying a password, the method comprising: receiving a set of characters as part of an access request procedure to access an access-controlled resource; determining that no subset of the set of characters exactly matches a stored password; accessing a plurality of ordered vectors comprising ordered subsets of the stored password, the plurality of ordered vectors each having a length less than a length of the stored password; creating a plurality of check vectors based on the received set of characters, the plurality of check vectors each having a length corresponding to a length of an ordered vector of the plurality of ordered vectors, wherein each vector of the plurality of check vectors comprises a different ordered combination of the received set of characters in a same order; determining a set of distances between each respective vector of the plurality of check vectors and each of the plurality of ordered vectors; selecting a vector of the set of check vectors corresponding to a smallest distance of the set of distances; and causing access to be granted to the access-controlled resource based on a comparison of a value corresponding to the selected vector and a threshold.

In Example 136, the subject matter of Example 135 includes, wherein determining the set of distances between each respective vector of the plurality of check vectors and each of the plurality of ordered vectors includes determining a Hamming distance between the respective vector and each of the plurality of ordered vectors.

In Example 137, the subject matter of Examples 135-136 includes, wherein causing access to be granted to the access-controlled resource includes determining that the smallest distance is greater than a zero distance threshold.

In Example 138, the subject matter of Examples 135-137 includes, selecting a second vector of the plurality of check vectors corresponding to a next smallest distance of the set of distances; and wherein causing access to be granted to the access-controlled resource includes determining that a ratio of the smallest distance and the next smallest distance is less than the threshold.

In Example 139, the subject matter of Examples 135-138 includes, receiving a second set of characters as part of a second access request procedure to access the access-control led resource; determining that a subset of the second set of characters exactly matches the stored password; and rejecting access based upon determining that the subset of the second set of characters exactly matches the stored password.

In Example 140, the subject matter of Examples 135-139 includes, receiving a second set of characters during a second access request procedure, wherein the set of characters differs from the second set of characters; selecting a second vector of a second plurality of check vectors corresponding to a new smallest distance of a second set of distances; and causing access to be granted to the access-controlled resource based on a comparison of a second value corresponding to the selected vector and a second threshold.

In Example 141, the subject matter of Examples 135-140 includes, wherein causing access to be granted to the access-controlled resource includes determining that the selected vector includes a minimum number of characters corresponding to the stored password.

Example 142 is a device for verifying a password entered, the device comprising: one or more hardware processors; a memory, storing instructions, which when executed, cause the one or more hardware processors to perform operations comprising: receiving a set of characters as part of an access request procedure to access an access-controlled resource; determining that no subset of the set of characters exactly matches a stored password; accessing a plurality of ordered vectors comprising ordered subsets of the stored password, the plurality of ordered vectors each having a length less than a length of the stored password; creating a plurality of check vectors based on the received set of characters, the plurality of check vectors each having a length corresponding to a length of an ordered vector of the plurality of ordered vectors, wherein each vector of the plurality of check vectors comprises a different ordered combination of the received set of characters in a same order; determining a set of distances between each respective vector of the plurality of check vectors and each of the plurality of ordered vectors; selecting a vector of the set of check vectors corresponding to a smallest distance of the set of distances; and causing access to be granted to the access-controlled resource based on a comparison of a value corresponding to the selected vector and a threshold.

In Example 143, the subject matter of Example 142 includes, wherein the operations of determining the set of distances between each respective vector of the plurality of check vectors and each of the plurality of ordered vectors includes determining a Hamming distance between the respective vector and each of the plurality of ordered vectors.

In Example 144, the subject matter of Examples 142-143 includes, wherein the operations of causing access to be granted to the access-controlled resource includes determining that the smallest distance is greater than a zero distance threshold.

In Example 145, the subject matter of Examples 142-144 includes, operations of: selecting a second vector of the plurality of check vectors corresponding to a next smallest distance of the set of distances; and wherein causing access to be granted to the access-controlled resource includes determining that a ratio of the smallest distance and the next smallest distance is less than the threshold.

In Example 146, the subject matter of Examples 142-145 includes, wherein the operations further comprise: receiving a second set of characters as part of a second access request procedure to access the access-controlled resource; determining that a subset of the second set of characters exactly matches the stored password; and rejecting access based upon determining that the subset of the second set of characters exactly matches the stored password.

In Example 147, the subject matter of Examples 142-146 includes, operations of: receiving a second set of characters during a second access request procedure, wherein the set of characters differs from the second set of characters; selecting a second vector of a second plurality of check vectors corresponding to a new smallest distance of a second set of distances; and causing access to be granted to the access-controlled resource based on a comparison of a second value corresponding to the selected vector and a second threshold.

In Example 148, the subject matter of Examples 142-147 includes, wherein the operations of causing access to be granted to the access-controlled resource includes determining that the selected vector includes a minimum number of characters corresponding to the stored password.

Example 149 is at least one machine-readable medium including instructions that, when executed by processing circuitry, cause the processing circuitry to perform operations to implement of any of Examples 1-148.

Example 150 is an apparatus comprising means to implement of any of Examples 1-148.

Example 151 is a system to implement of any of Examples 1-148.

Example 152 is a method to implement of any of Examples 1-148.

What is claimed is:

1. A device for authentication, the device comprising:
one or more hardware processors;
a memory, storing instructions, which when executed, cause the one or more hardware processors to perform operations comprising:
identifying a first set of characters corresponding to a stored password of an account;
receiving a second set of characters to be authenticated during an authentication attempt, wherein the received second set of characters to be authenticated include more characters than the first set of characters corresponding to the stored password;
requiring, as a condition precedent to granting access to an access-controlled resource:
that any set of characters submitted as part of any authentication attempt includes both a first subset of characters that matches the first set of characters corresponding to the stored password and in a same order, and a second subset of characters that are not specified for the authentication attempt and are interleaved with the first subset of characters in an order that is not specified for the authentication attempt; and
that the second set of characters or the second subset of characters do not exactly match, or do not meet a threshold level of similarity using a text comparison metric, to other sets of characters or other second subsets of characters submitted with either a specified number of previous authentication attempts of an account or previous authentication attempts of the account within a specified time period; and
causing access to an access-controlled resource to be granted only after based upon determining that the second set of characters includes both of the first subset and the second subset and that the second set of characters or the second subset of characters do not exactly match, or do not meet the threshold level of similarity using the text comparison metric, to the other sets of characters or the other second subsets of characters submitted with either the specified number of previous authentication attempts of the account or the previous authentication attempts of the account within the specified time period.

2. The device of claim 1, wherein the operations of determining that the second set of characters includes both of the first subset and the second subset comprises determining a match between portions of the second set of characters and the first set of characters based upon a distance function and a maximum distance threshold.

3. The device of claim 1, wherein the second set of characters is received over a network.

4. The device of claim 1, wherein the second set of characters is received from an input device communicatively coupled to the one or more hardware processors.

5. The device of claim 1, wherein the operations of causing access to the access-controlled resource to be granted comprises sending an indication that access was granted to a computing device that controls the access-controlled resource.

6. The device of claim 1, wherein the operations of determining that the second set of characters includes both of the first subset and the second subset comprises matching a plurality of vectors comprising permutations of the received second set of characters against the first set of characters.

7. The device of claim 6, wherein the operations of matching the plurality of vectors comprising permutations of the received second set of characters against the first set of characters comprises determining that a distance derived from a distance function is less than a threshold.

8. The device of claim 1, wherein the first set of characters are retrieved from a hardware storage device.

9. A method for authentication, the method comprising:
using one or more hardware processors:
identifying a first set of characters corresponding to a stored password of an account;
receiving a second set of characters to be authenticated during an authentication attempt, wherein the received second set of characters to be authenticated include more characters than the first set of characters corresponding to the stored password; and
requiring, as a condition precedent to granting access to an access-controlled resource:
that any set of characters submitted as part of any authentication attempt includes both a first subset of characters that matches the first set of characters corresponding to the stored password and in a same order, and a second subset of characters that are not specified for the authentication attempt and are interleaved with the first subset of characters in an order that is not specified for the authentication attempt; and that the second set of characters or the second subset of characters do not exactly match, or do not meet a threshold level of similarity using a text comparison metric, to other sets of characters or other second subsets of characters submitted with either a specified number of previous authentication attempts of an account or previous authentication attempts of the account within a specified time period; and causing access to an access-controlled resource to be granted only after based upon determining that the second set of characters includes both of the first subset and the second subset and that the second set of characters or the second subset of characters do not exactly match, or do not meet the threshold level of similarity using the text comparison metric, to the other sets of characters or the other second subsets of characters submitted with either the specified number of previous authentication attempts of the account or the previous authentication attempts of the account within the specified time period.

10. The method of claim 9, wherein determining that the second set of characters includes both of the first subset and the second subset comprises determining a match between portions of the second set of characters and the first set of characters based upon a distance function and a maximum distance threshold.

11. The method of claim 9, wherein the second set of characters is received over a network.

12. The method of claim 9, wherein the second set of characters is received from an input device communicatively coupled to the one or more hardware processors.

13. The method of claim 9, wherein causing access to the access-controlled resource to be granted comprises sending an indication that access was granted to a computing device that controls the access-controlled resource.

14. The method of claim 9, wherein determining that the second set of characters includes both of the first subset and the second subset comprises matching a plurality of vectors comprising permutations of the received second set of characters against the first set of characters.

15. The method of claim 14, wherein matching the plurality of vectors comprising permutations of the received second set of characters against the first set of characters comprises determining that a distance derived from a distance function does not exceed a threshold.

16. The method of claim 9, wherein the first set of characters are retrieved from a hardware storage device.

17. A device comprising:
means for identifying a first set of characters corresponding to a stored password, of an account;
means for receiving a second set of characters to be authenticated during an authentication attempt, wherein the received second set of characters to be authenticated include more characters than the first set of characters corresponding to the stored password; and
means for requiring, as a condition precedent to granting access to an access-controlled resource:
    that any set of characters submitted as part of any authentication attempt includes both a first subset of characters that matches the first set of characters corresponding to the stored password and in a same order, and a second subset of characters that are not specified for the authentication attempt and are interleaved with the first subset of characters in an order that is not specified for the authentication attempt; and
    that the second set of characters or the second subset of characters do not exactly match, or do not meet a threshold level of similarity using a text comparison metric, to other sets of characters or other second subsets of characters submitted with either a specified number of previous authentication attempts of an account or previous authentication attempts of the account within a specified time period; and
means for causing access to an access-controlled resource to be granted only after based upon determining that the second set of characters includes both of the first subset and the second subset and that the second set of characters or the second subset of characters do not exactly match, or do not meet the threshold level of similarity using the text comparison metric, to the other sets of characters or the other second subsets of characters submitted with either the specified number of previous authentication attempts of the account or the previous authentication attempts of the account within the specified time period.

18. The device of claim 17, wherein determining that the second set of characters includes both of the first subset and the second subset comprises means for determining a match between portions of the second set of characters and the first set of characters based upon a distance function and a maximum distance threshold.

* * * * *